(12) United States Patent
Rusanovskyy et al.

(10) Patent No.: US 11,122,288 B2
(45) Date of Patent: Sep. 14, 2021

(54) SPATIO-TEMPORAL MOTION VECTOR PREDICTION PATTERNS FOR VIDEO CODING

(71) Applicant: QUALCOMM Incorporated, San Diego, CA (US)

(72) Inventors: Dmytro Rusanovskyy, San Diego, CA (US); Nikolay Mikhaylovich Shlyakhov, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/704,827

(22) Filed: Dec. 5, 2019

(65) Prior Publication Data

US 2020/0186825 A1    Jun. 11, 2020

Related U.S. Application Data

(60) Provisional application No. 62/776,373, filed on Dec. 6, 2018.

(51) Int. Cl.
*H04N 19/52* (2014.01)
*H04N 19/593* (2014.01)
(Continued)

(52) U.S. Cl.
CPC ........... *H04N 19/52* (2014.11); *H04N 19/124* (2014.11); *H04N 19/13* (2014.11); *H04N 19/593* (2014.11); *H04N 19/61* (2014.11)

(58) Field of Classification Search
CPC .. H04N 19/105; H04N 19/109; H04N 19/124; H04N 19/13; H04N 19/167;
(Continued)

(56) References Cited

U.S. PATENT DOCUMENTS

2013/0107964 A1   5/2013   Wahadaniah et al.
2016/0105681 A1   4/2016   Lee
(Continued)

OTHER PUBLICATIONS

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
(Continued)

*Primary Examiner* — Farzana Hossain
(74) *Attorney, Agent, or Firm* — QUALCOMM Incorporated

(57) ABSTRACT

Techniques are described for constructing motion vector predictor lists based on spatially neighboring blocks and collocated blocks. A method of coding video data includes, for a first block, in a first picture having a left-to-right coding order, constructing a first motion vector predictor list, wherein a first entry in the first motion vector predictor list is based on motion vector information of a left neighboring block to the first block, coding the first block in the first picture based on the first motion vector predictor list, for a second block, in a second picture having a right-to-left coding order, constructing a second motion vector predictor list, wherein a first entry in the second motion vector predictor list is based on motion vector information of a right neighboring block to the second block, and coding the second block in the second picture based on the second motion vector predictor list.

30 Claims, 12 Drawing Sheets

(51) Int. Cl.
*H04N 19/124* (2014.01)
*H04N 19/13* (2014.01)
*H04N 19/61* (2014.01)

(58) Field of Classification Search
CPC .... H04N 19/176; H04N 19/52; H04N 19/593; H04N 19/61
See application file for complete search history.

(56) References Cited

U.S. PATENT DOCUMENTS

2017/0347117 A1  11/2017  Bici et al.
2018/0103265 A1  4/2018  Park et al.

OTHER PUBLICATIONS

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.
Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.
Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.
Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
Ergen S., "ZigBee/IEEE 802.15.4 Summary", Sep. 10, 2004, 37 Pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
International Search Report and Written Opinion—PCT/US2019/064953—ISA/EPO—Feb. 21, 2020 (16 pp).
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 Pages.
ITU-T H.265, "Series H: Audiovisual and Multimedia Systems, Infrastructure of audiovisual services—Coding of moving video, High efficiency video coding," The International Telecommunication Union. Dec. 2016, 664 Pages.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.
Yu R., et al., "CE 4-2.1: Adding Non-adjacent Spatial Merge Candidates", JVET-K0228-v1, The Joint Video Exploration Team of ISO/IEC JTC1/SC29/WG11 and ITU-T SG.16 WP 3, 11th Meeting: Ljubljana, SI, Jul. 10-18, 2018, pp. 1-3.
Zhang (Bytedance) L., et al., "CE4-related: History-based Motion Vector Prediction", 11. JVET Meeting, Jul. 11, 2018-Jul. 18, 2018, Ljubljana, (The Joint Video Explorationteam of ISO/IEC JTC1/SC29/WG11 and ITU-TSG.16), No. JVET-K0104-v5, Jul. 18, 2018 (Jul. 18, 2018), XP030200019, 7 Pages, Retrieved from the Internet:URL:http://phenix.int-evry.fr/jvet/doc_end_user/documents/11_Ljubljana/wg11/JVET-K0104-v5.zip JVET-K0104 r4.docx [retrieved on Jul. 18, 2018] abstract sections 1-2.

SPATIO-TEMPORAL MOTION VECTOR PREDICTION PATTERNS FOR VIDEO CODING

This application claims the benefit of U.S. Provisional Application No. 62/776,373, filed Dec. 6, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction and motion vector prediction in video coding. More specifically, this disclosure describes techniques for spatio-temporal motion vector prediction, such as motion vector prediction based on a motion vector predictor list. The techniques of this disclosure may be used with any of the existing video codecs, such as H.265/HEVC (High Efficiency Video Coding), or be an efficient coding tool in any future video coding standards, such as H.266/VVC (Versatile Video Coding).

As described in more detail, the disclosure describes examples techniques of constructing a motion vector predictor list that includes motion vector information of spatially and temporally neighboring blocks. In some cases, the coding order of a picture (e.g., left-to-right or right-to-left) may impact which spatially neighboring blocks are available for constructing the motion vector predictor list. Accordingly, this disclosure describes example techniques by which a video coder (e.g., video encoder or video decoder) may construct the motion vector predictor list based on the coding order used for a picture. Furthermore, for temporally neighboring blocks (also called collocated blocks), the video coder may be configured to access and check availability of motion vector information of the temporally neighboring blocks in a particular order.

In one example, the disclosure describes a method of coding video data, the method comprising for a first block, in a first picture having a left-to-right coding order, constructing a first motion vector predictor list, wherein a first entry in the first motion vector predictor list is based on motion vector information of a left neighboring block to the first block, coding the first block in the first picture based on the first motion vector predictor list, for a second block, in a second picture having a right-to-left coding order, constructing a second motion vector predictor list, wherein a first entry in the second motion vector predictor list is based on motion vector information of a right neighboring block to the second block, and coding the second block in the second picture based on the second motion vector predictor list.

In one example, the disclosure describes a device for coding video data, the device comprising memory configured to store motion vector information and processing circuitry coupled to the memory. The processing circuitry is configured to for a first block, in a first picture having a left-to-right coding order, construct a first motion vector predictor list, wherein a first entry in the first motion vector predictor list is based on motion vector information of a left neighboring block to the first block stored in the memory, code the first block in the first picture based on the first motion vector predictor list, for a second block, in a second picture having a right-to-left coding order, construct a second motion vector predictor list, wherein a first entry in the second motion vector predictor list is based on motion vector information of a right neighboring block to the second block stored in the memory, and code the second block in the second picture based on the second motion vector predictor list.

In one example, the disclosure describes a computer-readable storage medium storing instructions thereon that when executed cause one or more processors to for a first block, in a first picture having a left-to-right coding order, construct a first motion vector predictor list, wherein a first entry in the first motion vector predictor list is based on motion vector information of a left neighboring block to the first block, code the first block in the first picture based on the first motion vector predictor list, for a second block, in a second picture having a right-to-left coding order, construct a second motion vector predictor list, wherein a first entry in the second motion vector predictor list is based on motion vector information of a right neighboring block to the second block, and code the second block in the second picture based on the second motion vector predictor list.

The details of one or more examples are set forth in the accompanying drawings and the description below. Other features, objects, and advantages will be apparent from the description, drawings, and claims.

DETAILED DESCRIPTION

Figure 1:
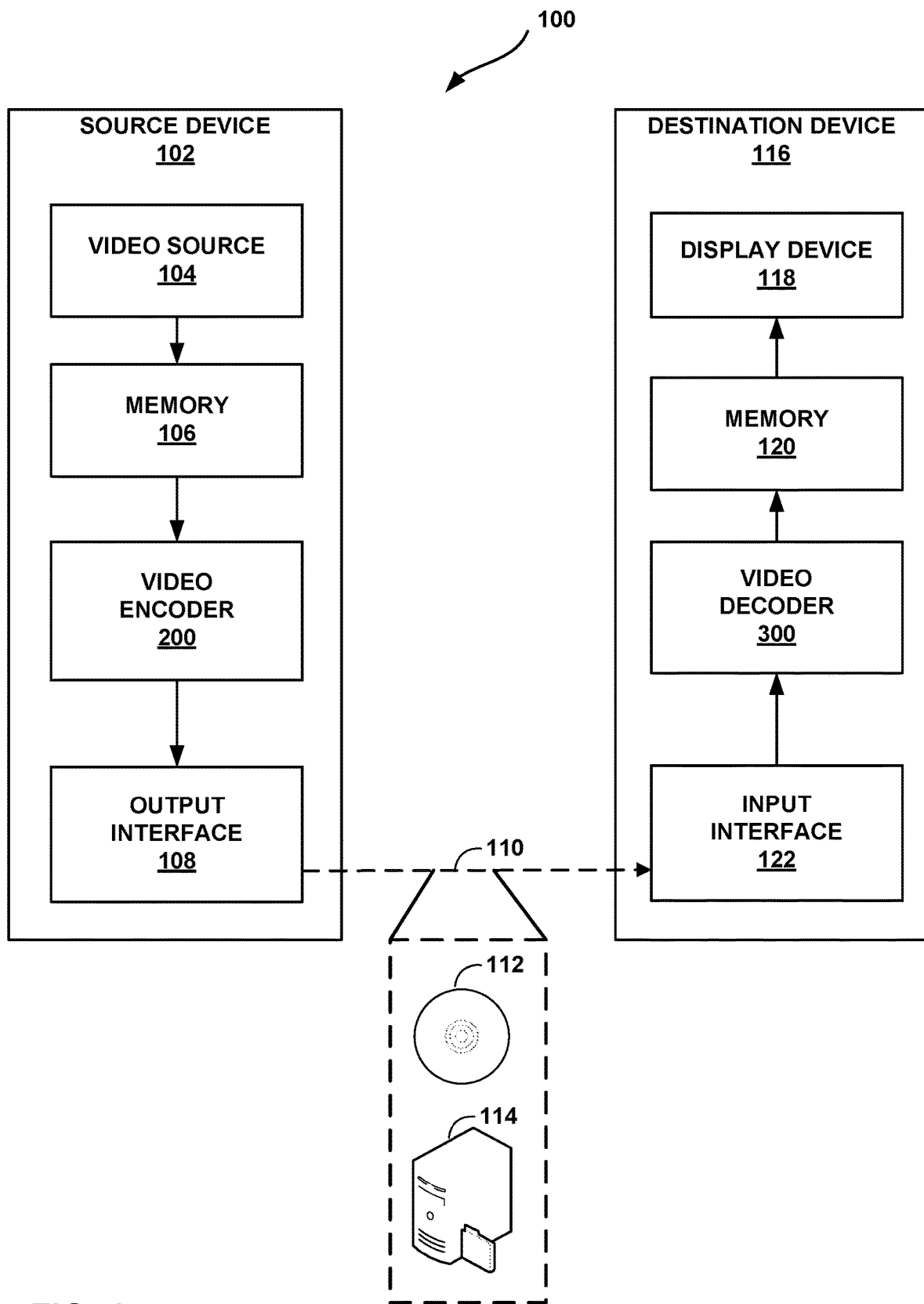
FIG. 1 is a block diagram illustrating an example video encoding and decoding system that may perform the techniques of this disclosure.

In some examples, video coding (e.g., video encoding or video decoding) may include inter-prediction and/or intra block copy (IBC) techniques. In both inter-prediction or IBC, a video encoder determines a prediction block based on a motion vector (for IBC, the motion vector may be a block vector) for a current block, determines residual information (e.g., difference) between the prediction block and the current block, and signals the residual information. A video decoder receives the residual information. In addition, the video decoder determines a motion vector for the current block and determines the prediction block based on the motion vector. The video decoder adds the residual information to the prediction block to reconstruct the current block.

One way in which the video decoder determines the motion vector for the current block is based on a motion vector predictor list. Both the video encoder and the video decoder utilize a similar process to construct respective motion vector predictor lists such that the motion vector predictor list constructed by the video encoder and the motion vector predictor list constructed by the video decoder is the same. The motion vector predictor list includes motion vector information of previously coded blocks, such as spatially neighboring blocks (e.g., blocks that neighbor the current block in the same picture as the current block) and collocated blocks (e.g., blocks that are located at particular locations in other pictures). In some examples, a motion vector predictor list may include artificially-generated motion vector information (e.g., motion vector information that is not from a previously-coded block).

The video encoder determines an entry in the motion vector predictor list and signals information indicative of the entry. The video decoder determines motion vector information from the motion vector predictor list based on the entry and determines the motion vector for the current block based on the determined motion vector information. As one example, the video decoder may set the motion vector for the current block equal to the determined motion vector information (e.g., such as in merge mode). As another example, the video decoder may add a motion vector difference (MVD), signaled by the video encoder, to the determined motion vector information to determine the motion vector for the current block (e.g., such as in advanced motion vector prediction (AMVP) mode).

As described above, the motion vector predictor list may include motion vector information for spatially neighboring blocks. In some examples, for the motion vector information of a spatially neighboring block to be available, the spatially neighboring block was previously coded (e.g., encoded or decoded). If a neighboring block has not been coded yet, then the video encoder and the video decoder may not have yet determined and may not yet have the necessary information to determine the motion vector information for this as-of-yet coded neighboring block. Therefore, in some examples, the only spatially neighboring blocks that can be checked for motion vector information are previously coded blocks.

However, which blocks are previously coded blocks may be based on the coding order of the picture. For instance, the video coder (e.g., video encoder or video decoder) may code a first picture from left-to-right and top-to-bottom. To code the first picture from left-to-right and top-to-bottom may refer to the video coder coding block-by-block within the first picture starting from the top-left block in the first picture and coding blocks in a rightward direction until the video coder reaches the right boundary of the first picture. Then the video coder returns to the block below the top-left block in the first picture and codes block-by-block until the video coder reaches the right boundary of the first picture. The video coder repeats these operations until the video coder codes the bottom-right block of the first picture.

The coding order need not necessarily be left-to-right and top-to-bottom. The video coder may code a second picture from right-to-left and top-to-bottom. To code the second picture from right-to-left and top-to-bottom may refer to the video coder coding block-by-block within the second picture starting from the top-right block in the second picture and coding blocks in a leftward direction until the video coder reaches the left boundary of the second picture. Then the video coder returns to the block below the top-right block in the second picture and codes block-by-block until the video coder reaches the left boundary of the second picture. The video coder repeats these operations until the video coder codes the bottom-left block of the second picture.

Due to the different coding orders for the first and second pictures, there may be different spatially neighboring blocks that were previously coded for a block in the first picture as compared to a block in the second picture. As an example, for a first block, in the first picture having a left-to-right coding order, a left neighboring block to the first block may have been already coded before the first block is coded, and therefore, the motion vector information for the left neighboring block may be available (e.g., previously determined). Also, for the first block, a right neighboring block to the first block may not have yet been coded, and therefore, the motion vector information for the right neighboring block may not be available (e.g., not yet determined).

For a second block, in the second picture having a right-to-left coding order, the opposite of the first block in the first picture may be true. For example, for the second block, in the second picture having a right-to-left coding order, a left neighboring block to the second block may not have yet been coded, and therefore, the motion vector information for the left neighboring block may not be available (e.g., not yet determined). Also, for the second block, a right neighboring block to the second block may have been already coded before the second block is coded, and therefore, the motion vector information for the right neighboring block may be available (e.g., previously determined).

Because which spatially neighboring blocks have been coded may be based on the coding order of the picture, the techniques to construct the motion vector predictor list for the first block in the first picture having the left-to-right coding order and the techniques to construct the motion vector predictor list for the second block in the second picture having the right-to-left coding order may be different. In one or more examples described in this disclosure, the positions of the set of spatially neighboring blocks whose motion vector information forms the motion vector predictor list for the first block may be inverted relative to the positions of the set of spatially neighboring blocks whose motion vector information forms the motion vector predictor list for the second block.

For instance, for a first block, in a first picture having a left-to-right coding order, the video coder may construct a first motion vector predictor list such that a first entry in the first motion vector predictor list is based on motion vector information of a left neighboring block to the first block. For a second block, in a second picture having a right-to-left coding order, the video coder may construct a second motion vector predictor list such that a first entry in the second motion vector predictor list is based on motion vector information of a right neighboring block to the second block. The left neighboring block relative to the first block and the right neighboring block relative to the second block may be considered as being inverted relative to one another (e.g., left neighboring block is on left and right neighboring block is on right).

In some examples, the video coder may construct the first motion vector predictor list such that the first motion vector predictor list has motion vector information in the following order: motion vector information of the left neighboring block, motion vector information of an above neighboring block, motion vector information of an above-right neighboring block, motion vector information of a below-left neighboring block, and motion vector information of an above-left neighboring block. The video coder may construct the second motion vector predictor list such that the second motion vector predictor list has motion vector information in the following order: motion vector information of the right neighboring block, motion vector information of an above neighboring block, motion vector information of an above-left neighboring block, motion vector information of a below-right neighboring block, and motion vector information of an above-right neighboring block.

In the above example, the first and second motion vector predictor lists have a particular order in which the motion vector information for the spatially neighboring blocks is arranged in the motion vector predictor list(s). Although there is a particular order in which the motion vector information is arranged, the video coder may be configured to access the motion vector information from the spatially neighboring blocks in parallel. This may allow the video coder to access motion vector information with one memory call (e.g., with a batch request) rather than requiring multiple memory calls. The video coder may then arrange the motion vector information according to a particular order, such as the example orders described above.

In some techniques, whether motion vector information of a particular spatially neighboring block is included or not in the motion vector predictor list is based on availability of motion vector information of another block. Stated another way, whether a particular spatially neighboring block is to be added in the motion vector predictor list is conditional (e.g., conditioned based on availability of motion vector information of another block). Due to there being a condition on whether the motion vector information for the spatially neighboring is included or not, the video coder may need to first access the motion vector information of the other block to determine if the condition is met or not, and then, based on whether the condition is met or not, send another request for the motion vector information of the spatially neighboring block. Such techniques may result in multiple memory calls, which can increase the amount of time it takes to code a block.

In one more examples described in this disclosure, whether motion vector information of a particular spatially neighboring block is to be included in a motion vector predictor list is not conditional upon whether motion vector information of another block is available or not. In this manner, the video coder may be able to access the motion vector information of the spatially neighboring blocks with a batch request to memory instead of multiple requests, which can reduce the amount of time it takes to code a block and improve the operation of the video coder.

As described above, in addition to motion vector information of spatially neighboring blocks, the video coder may include motion vector information of one or more collocated blocks (also called temporally neighboring blocks). The one or more collocated blocks are blocks in another picture (called a reference picture) other than the picture that includes the block being coded. One example of the collocated blocks is a block located at a position in the reference picture that overlaps a position of the current block being coded in the current picture. Stated another way, the current block may define an area within the current picture, and a block that is within the same area, but in the reference picture, is an example of a collocated block. This example of a collocated block may be referred to as a center collocated block.

Another example of a collocated block is a block that is located below the current block but in the reference picture (e.g., below the area defined by the current block in the current picture, but in the reference picture). This example of a collocated block may be referred to as a bottom collocated block. Another example of a collocated block is a block that is located to the right of the current block but in the reference picture (e.g., right of the area defined by the current block in the current picture, but in the reference picture). This example of a collocated block may be referred to as a right collocated block. Another example of a collocated block is a block that is located to the left of the current block but in the reference picture (e.g., left of the area defined by the current block in the current picture, but in the reference picture). This example of a collocated block may be referred to as a left collocated block.

In one or more examples, the video coder may determine if motion vector information for the center collocated block is available. If motion vector for the center collocated block is available, the video coder may add the motion vector information to the motion vector predictor list, and not check any other collocated blocks. If the motion vector for the center collocated block is not available, the video coder may determine if motion vector information for the below collocated block is available. If motion vector for the below collocated block is available, the video coder may add the motion vector information to the motion vector predictor list, and not check any other collocated blocks.

If the motion vector for the below collocated block is not available, the video coder may determine if motion vector information for one of the right collocated block or the left collocated block is available based on the picture coding order. As one example, if the coding order is left-to-right, then the video coder may determine if motion vector information for right collocated block is available. If the coding order is right-to-left, then the video coder may determine if motion vector information for the left collocated block is available. In other examples, the video coder may perform the inverse (e.g., motion vector information for left collocated block for left-to-right coding order and motion vector information for right collocated block for right-to-left coding order). If motion vector for the right or left collocated block, as applicable, is available, the video coder may add the motion vector information to the motion vector predictor list, and not check any other collocated blocks.

There may be additional examples of collocated blocks. For instance, a collocated block may be bottom-right block that is positioned to the bottom and right (e.g., diagonally in the bottom-right direction) of the current block but in the reference picture (e.g., bottom-right of the area defined by the current block in the current picture, but in the reference picture). Another example of a collocated block may be bottom-left block that is positioned to the bottom and left (e.g., diagonally in the bottom-left direction) of the current block but in the reference picture (e.g., bottom-left of the area defined by the current block in the current picture, but in the reference picture). Whether the video coder checks the bottom-right or bottom-left collocated block for motion vector information may be based on the picture coding order (e.g., bottom-right collocated block for left-to-right coding order and bottom-left collocated block for right-to-left coding order, or vice-versa).

Furthermore, the video coder may add motion vector information to the motion vector predictor list until the motion vector predictor list is full (e.g., until the number of entries in the motion vector predictor list equals the maximum size of the motion vector predictor list). In some examples, the size of the motion vector predictor list may be based on the size of the block. For example, if a block has a size greater than a threshold size, then the maxim size of the motion vector predictor list may be M (e.g., there may be a maximum of M number of entries in the motion vector predictor list). If a block has a size less than the threshold size, then the maximum size of the motion vector predictor list may be X (e.g., there may be a maximum of X number of entries in the motion vector predictor list). X may be less than M.

As an example, if a block has a size greater than N×4 or 4×N, then the maximum size of the motion vector predictor list may be six (e.g., M=6). If a block has a size less than N×4 or 4×N, then the maximum size of the motion vector predictor list may be four (e.g., X=4). Where the threshold size is N×4 or 4×N, N may less than or equal to eight.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for spatio-temporal motion vector prediction, such as constructing the motion vector predictor list using one or more of the example techniques described in this disclosure. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for spatio-temporal motion vector prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a video coding standard, named High Efficiency Video Coding (HEVC) or ITU-T H.265 (as described in G. J. Sullivan, J.-R. Ohm, W.-J. Han, T. Wiegand "Overview of the High Efficiency Video Coding (HEVC) Standard," IEEE Transactions on Circuits and Systems for Video Technology, vol. 22, no. 12. pp. 1649-1668, December 2012), including its range extension, multiview extension (MV-HEVC) and scalable extension (SHVC), has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). An HEVC draft specification, and referred to as HEVC WD hereinafter, is available from http://phenix.int-evry.fr/jct/doc_end_user/documents/14_Vienna/wg11/JCTVC-N1003-v1.zip. The latest version of the Final Draft of International Standard (FDIS) of HEVC can be found in http://phenix.it-sudparis.eu/jct/doc_end_user/documents/12_Geneva/wg11/JCTVC-L1003-v34.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Test Model 7 (JEM 7) could be downloaded from: https://jvet.hhi.fraunhofer.de/svn/svn_HMJEMSoftware/tags/HM-16.6-JEM-7.2/ An Algorithm description of Joint Exploration Test Model 7 (JEM-7) is described in J. Chen, E. Alshina, G. J. Sullivan, J.-R. Ohm, J. Boyce, "Algorithm Description of Joint Exploration Test Model 7", JVET-G1001, July, 2017. A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). The techniques of this disclosure, however, are not limited to any particular coding standard.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) and/or VVC. Another example of a video coding standard is the essential video coding (EVC) standard. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to examples of JEM and/or VVC. According to examples of JEM/VVC, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of examples of JEM/VVC removes the concepts of multiple partition types, such as the separation between CUs, PUs, and TUs of HEVC. A QTBT structure of examples of JEM/VVC includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to examples of JEM/VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM or VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left-to-right, top-to-bottom coding order or right-to-left, top-to-bottom coding order).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to construct a motion vector predictor list. As described above, for merge mode and AMVP mode, video decoder 300 may determine a motion vector for a current block being decoded based on motion vector information in the motion vector predictor list. For example, video encoder 200 may signal information indicative of an index into the motion vector predictor list, and video decoder 300 may retrieve the motion vector information stored in the motion vector predictor list based on the index. For merge mode, video decoder 300 may set the motion vector for the current block equal to the retrieved motion vector information. For AMVP mode, video decoder 300 may further receive information indicative of a motion vector difference (MVD) between the motion vector for the current block and the retrieve motion vector information. In such example, video decoder 300 may add the MVD to the retrieved motion vector information to determine the motion vector for the current block.

In merge and AMVP mode, video encoder 200 and video decoder 300 may be configured to construct the motion vector predictor list in a similar manner such that the motion vector predictor list constructed by video encoder 200 and the motion vector predictor list constructed by video decoder 300 are substantially the same. To construct the motion vector predictor list, video encoder 200 and video decoder 300 may retrieve motion vector information of spatially neighboring blocks and temporally neighboring blocks (also called collocated blocks). Spatially neighboring blocks refer to blocks located in the current picture that includes the current block being encoded or decoded. Collocated blocks refer to blocks located in a reference picture that is different than the current picture.

Figure 8A:
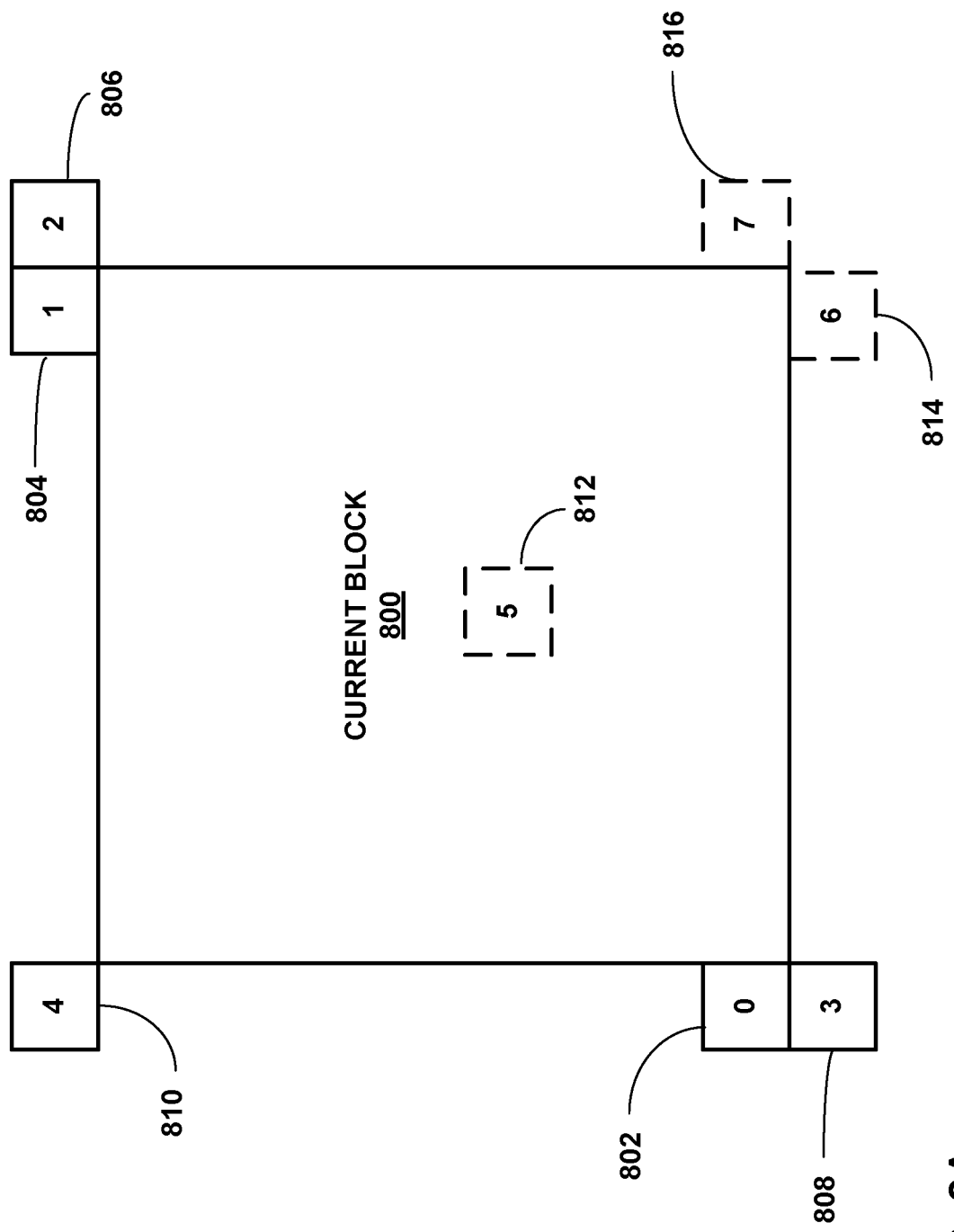
FIG. 8A is a conceptual diagram illustrating an example spatial temporal motion vector predictor pattern according to one example of the disclosure.
Figure 8B:
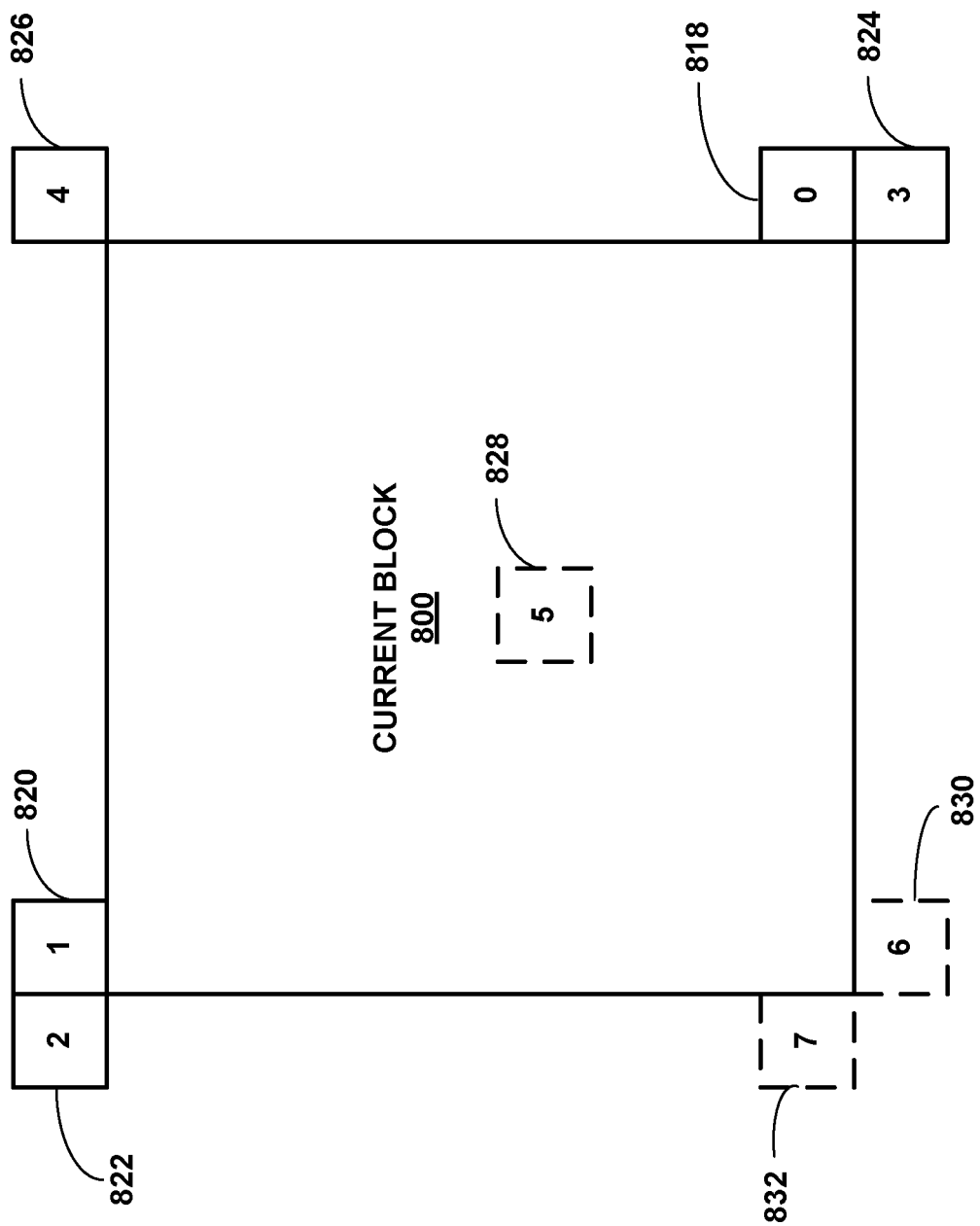
FIG. 8B is a conceptual diagram illustrating an example inverted spatial temporal motion vector predictor pattern according to one example of the disclosure.

However, which spatially neighboring blocks video encoder 200 and video decoder 300 check for motion vector information may be based on a coding order of the current picture in which the current block being encoded or decoded is located. As described in more detail below, in examples where the current picture has a left-to-right coding order, examples of the spatially neighboring blocks that are checked are illustrated in FIG. 8A and identified as block 0 802, block 1 804, block 2 806, block 3 808, and block 4 810. In examples where the current picture has a right-to-left coding order, examples of the spatially neighboring blocks that are checked are illustrated in FIG. 8B and identified as block 0 818, block 1 820, block 2 822, block 3 824, and block 4 826. In this way, video encoder 200 and video decoder 300 may be configured to check different spatially neighboring blocks based on the coding order of the picture.

In addition to spatially neighboring blocks, video encoder 200 and video decoder 300 may include motion vector information of collocated blocks. In some examples, for left-to-right coding order of the current picture, video encoder 200 and video decoder 300 may determine if motion vector information of center collocated block 5 812 of FIG. 8A is available, and if available, include the motion vector information of center collocated block 5 812 in the motion vector predictor list and not check or include motion vector information of any other collocated block.

If motion vector information of center collocated block 5 812 is not available, video encoder 200 and video decoder 300 may determine if motion vector information of bottom collocated block 6 814 of FIG. 8A is available, and if available, include the motion vector information of bottom collocated block 6 814 in the motion vector predictor list and not check or include motion vector information of any other collocated block. As illustrated, bottom collocated block 6 814 may be a block that is bottom and closest to the right of current block 800 (e.g., block 6 814 is below current block 800 of FIG. 8A and the right boundary of block 6 814 is the same as the right boundary of current block 800 of FIG. 8A). That is, a right boundary of the bottom collocated block is in same location in the picture other than the picture that includes current block 800 as a right boundary of current block 800. The coordinates for block 6 814 may be (xColBot, yColBot), where xColBot=xCb+cbWidth−1, and yColBot=yCb+cbHeight, where (xCb, yCb) are the coordinates for current block 800 of FIG. 8A, cbWidth is the width of current block 800 of FIG. 8A, and cbHeight is the height of current block 800 of FIG. 8A.

If motion vector information of bottom collocated block 6 814 is not available, video encoder 200 and video decoder 300 may determine if motion vector information of right collocated block 7 816 of FIG. 8A is available, and if available, include the motion vector information of right collocated block 7 816 in the motion vector predictor list and not check or include motion vector information of any other collocated block. As illustrated, right collocated block 7 816 may be a block right and closest to the bottom of current block 800 of FIG. 8A (e.g., block 7 816 is right of current block 800 of FIG. 8A and the bottom boundary of block 7 816 is the same as the bottom boundary of current block 800 of FIG. 8A). The coordinates for block 7 816 may be (xColBr, yColBr), where xColBr=xCb+cbWidth, and yColBr=yCb+cbHeight−1, where (xCb, yCb) are the coordinates for current block 800 of FIG. 8A, cbWidth is the width of current block 800 of FIG. 8A, and cbHeight is the height of current block 800 of FIG. 8A.

In some examples, for right-to-left coding order of the current picture, video encoder 200 and video decoder 300 may determine if motion vector information of center collocated block 5 828 of FIG. 8B is available, and if available, include the motion vector information of center collocated block 5 828 in the motion vector predictor list and not check or include motion vector information of any other collocated block.

If motion vector information of center collocated block 5 828 is not available, video encoder 200 and video decoder 300 may determine if motion vector information of bottom collocated block 6 830 of FIG. 8B is available, and if available, include the motion vector information of bottom collocated block 6 830 in the motion vector predictor list and not check or include motion vector information of any other collocated block. As illustrated, bottom collocated block 6 830 may be a block that is bottom and closest to the left of current block 800 (e.g., block 6 830 is below current block 800 of FIG. 8B and the left boundary of block 6 830 is the same as the left boundary of current block 800 of FIG. 8B). That is, a left boundary of the bottom collocated block is in same location in the picture other than the picture that includes current block 800 as a left boundary of current block 800. The coordinates for block 6 830 may be (xColBot, yColBot), where xColBot=xCb, and yColBot=yCb+cbHeight, where (xCb, yCb) are the coordinates for current block 800 of FIG. 8B, cbWidth is the width of current block 800 of FIG. 8B, and cbHeight is the height of current block 800 of FIG. 8B.

If motion vector information of bottom collocated block 6 830 is not available, video encoder 200 and video decoder 300 may determine if motion vector information of left collocated block 7 832 of FIG. 8B is available, and if available, include the motion vector information of left collocated block 7 832 in the motion vector predictor list and not check or include motion vector information of any other collocated block. As illustrated, left collocated block 7 832 may be a block left and closest to the bottom of current block 800 of FIG. 8B (e.g., block 7 832 is left of current block 800 of FIG. 8B and the bottom boundary of block 7 832 is the same as the bottom boundary of current block 800 of FIG. 8B). The coordinates for block 7 832 may be (xColBr, yColBr), where xColBr=xCb−1, and yColBr=yCb+cbHeight−1, where (xCb, yCb) are the coordinates for current block 800 of FIG. 8B, cbWidth is the width of current block 800 of FIG. 8B, and cbHeight is the height of current block 800 of FIG. 8B.

In some examples, the collocated positions of blocks 814, 816 of FIG. 8A and blocks 830, 832 of FIG. 8B may be defined with granularity 8×8 block. For example, if current CU (e.g., current block 800 of FIG. 8A or 8B) is 64×64, there may be multiple 8×8 blocks available at bottom, left, or right. In some examples, only cornered 8×8 blocks (e.g., blocks 814, 816, 830, 832) may be used to provide a motion vector.

Moreover, in some examples, the size of the motion vector predictor list may be based on the size of the current block. As one example, if the size of the current block is greater than a threshold, then the maximum number of entries of the motion vector predictor list may be greater than if the size of the current block is less than the threshold. For example, if the size of the current block is greater than N×4 or 4×N, where N is less than or equal to 8, then the maximum size of the motion vector predictor list may be six. If the size of the current block is less than N×4 or 4×N, where N is less than or equal to 8, then the maximum size of the motion vector predictor list may be four. The above values are merely one example to assist with understanding and should not be considered as limiting.

This disclosure may generally refer to "signaling" certain information, such as syntax elements. The term "signaling" may generally refer to the communication of values of syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
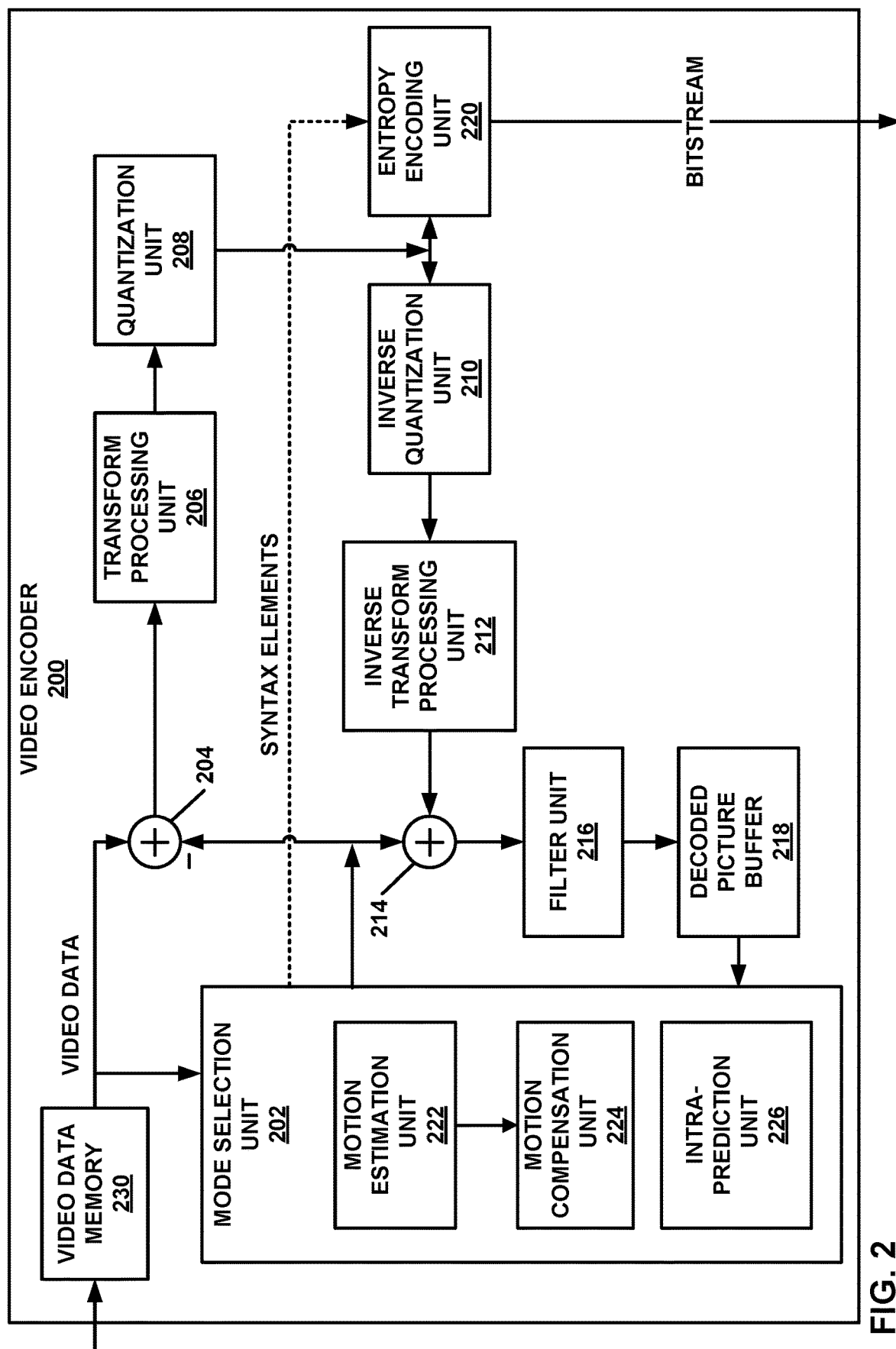
FIG. 2 is a block diagram illustrating an example video encoder that may perform the techniques of this disclosure.
Figure 3:
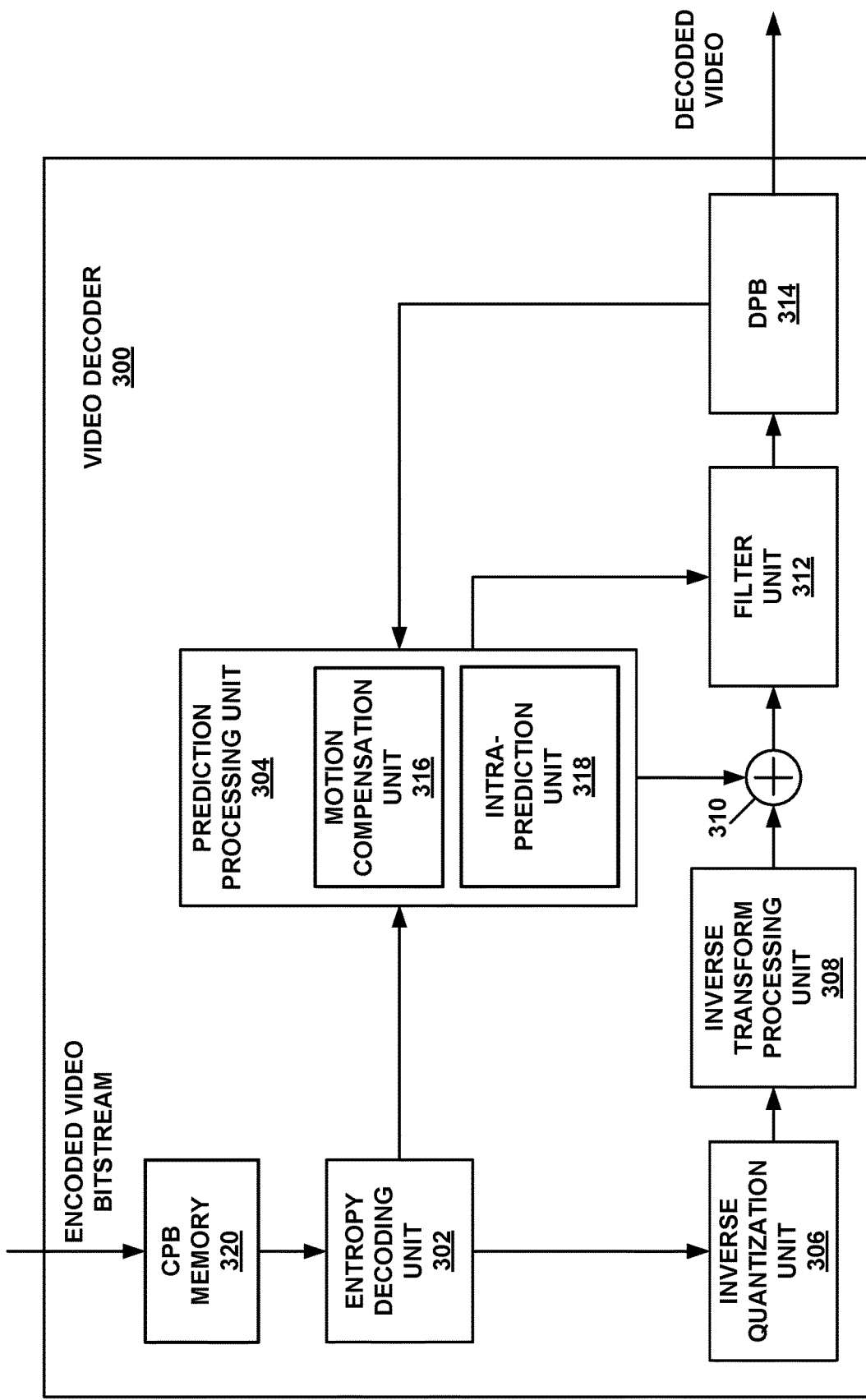
FIG. 3 is a block diagram illustrating an example video decoder that may perform the techniques of this disclosure.

Examples of video encoder 200 and video decoder 300 are illustrated and described in more detail with respect to FIGS. 2 and 3. Prior to describing FIGS. 2 and 3, the following describes some additional details of the video coding process, such as motion vector prediction, with respect to FIGS. 4A, 4B, 5A, 5B, and 6.

Figure 7A:
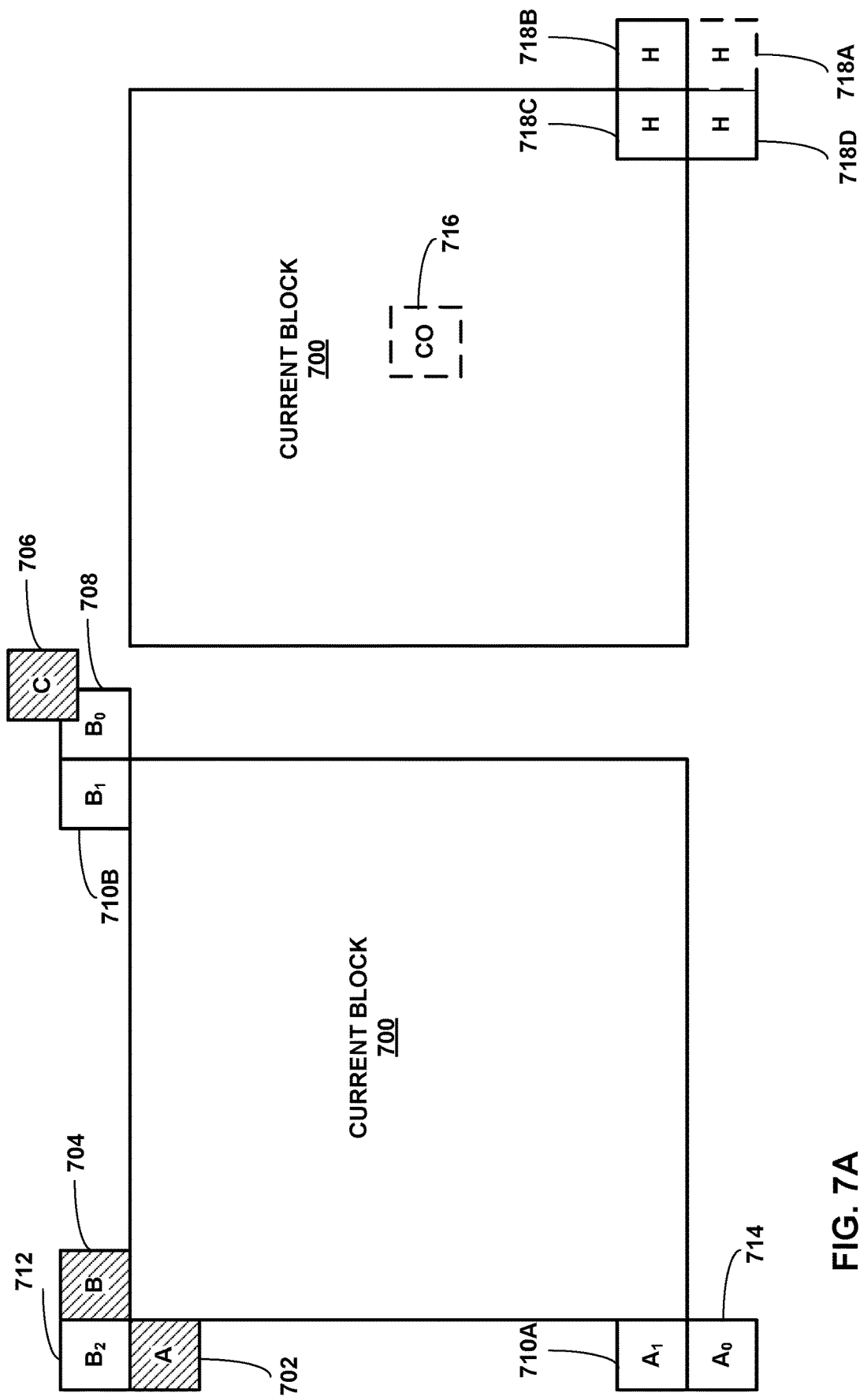
FIG. 7A is a conceptual diagram illustrating example spatial and temporal candidates used in motion vector prediction.
Figure 7B:
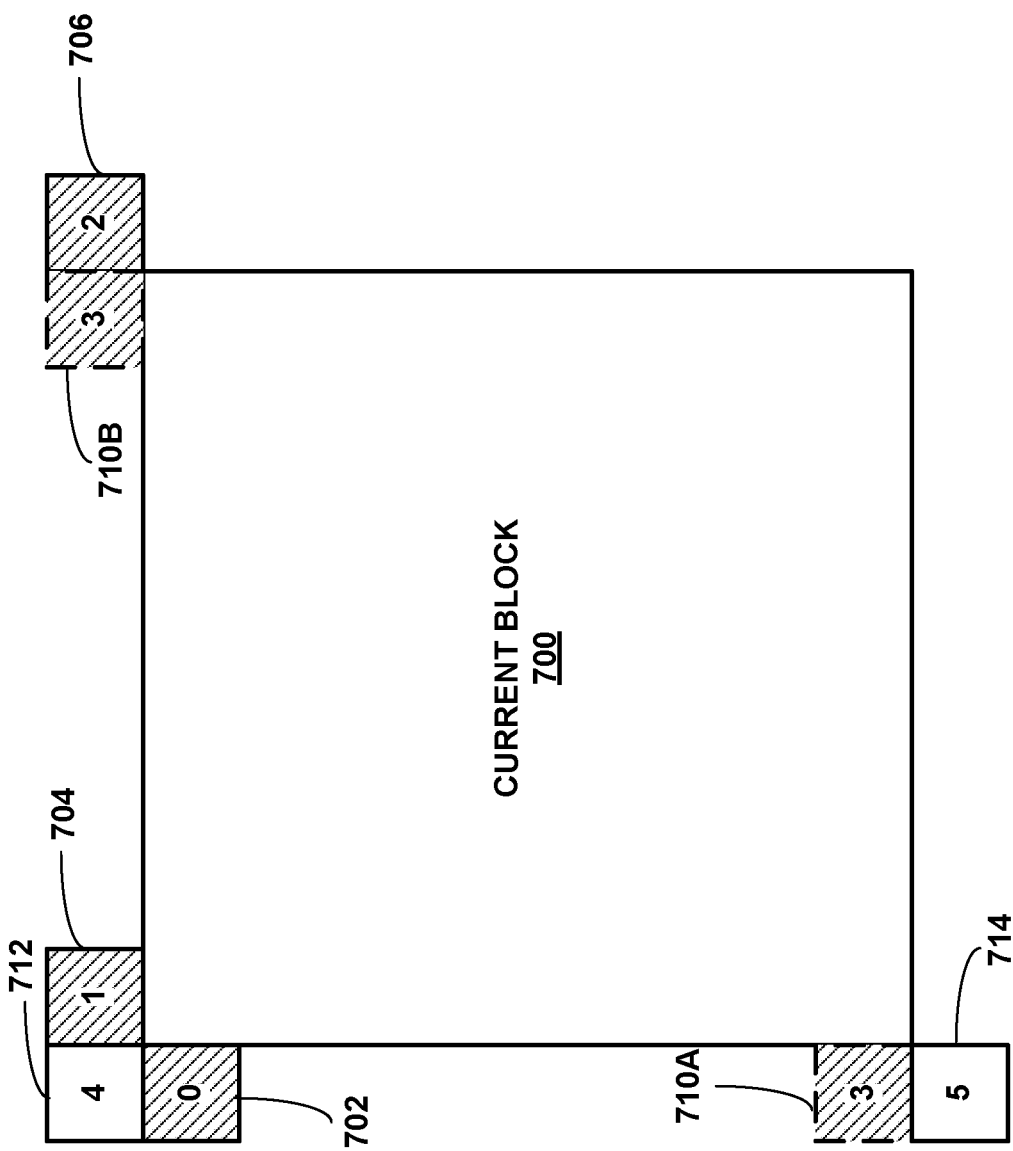
FIG. 7B is a conceptual diagram illustrating an example visiting order for spatial candidates.
Figure 7C:
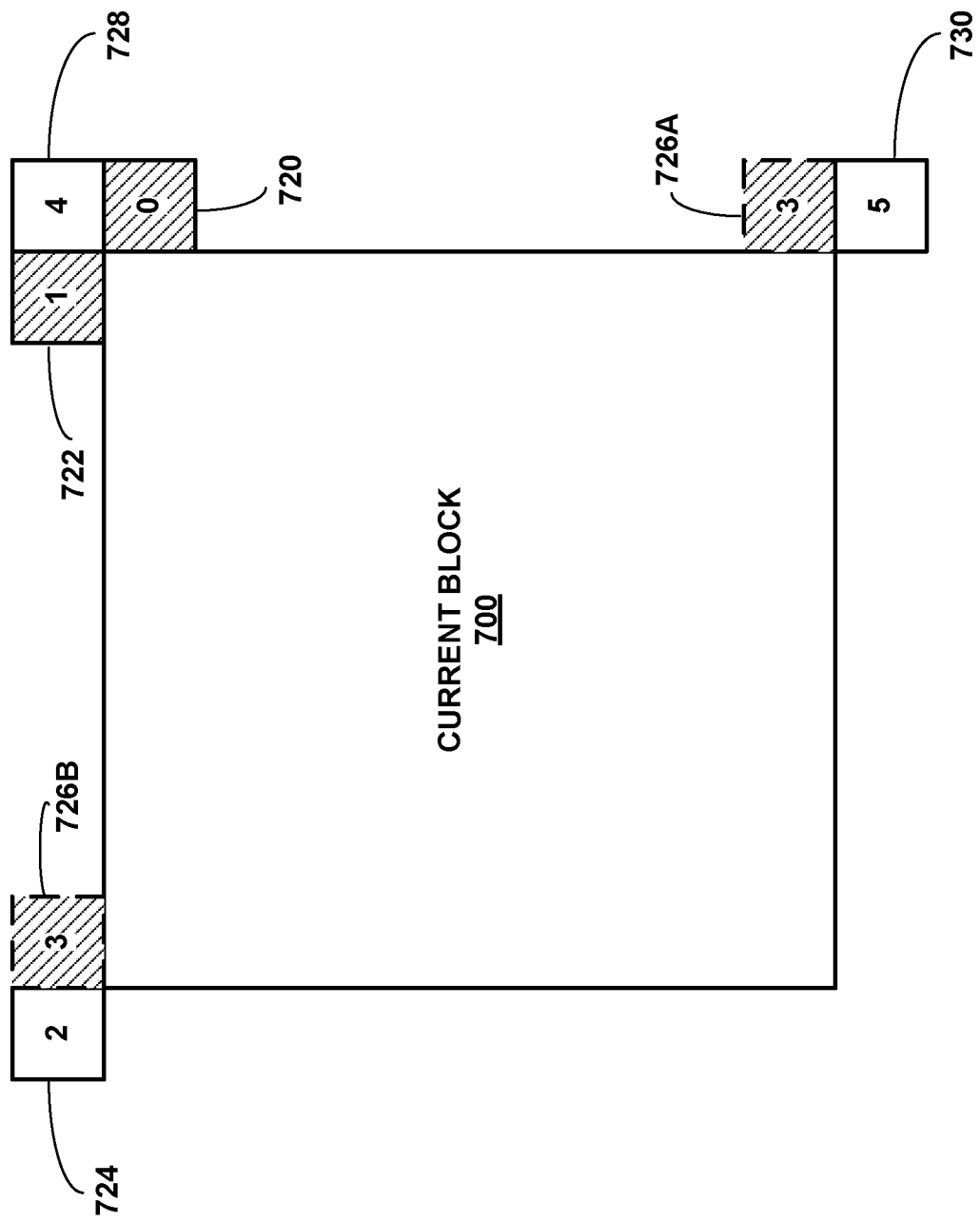
FIG. 7C is a conceptual diagram illustrating another example visiting order for spatial candidates.
Figure 8C:
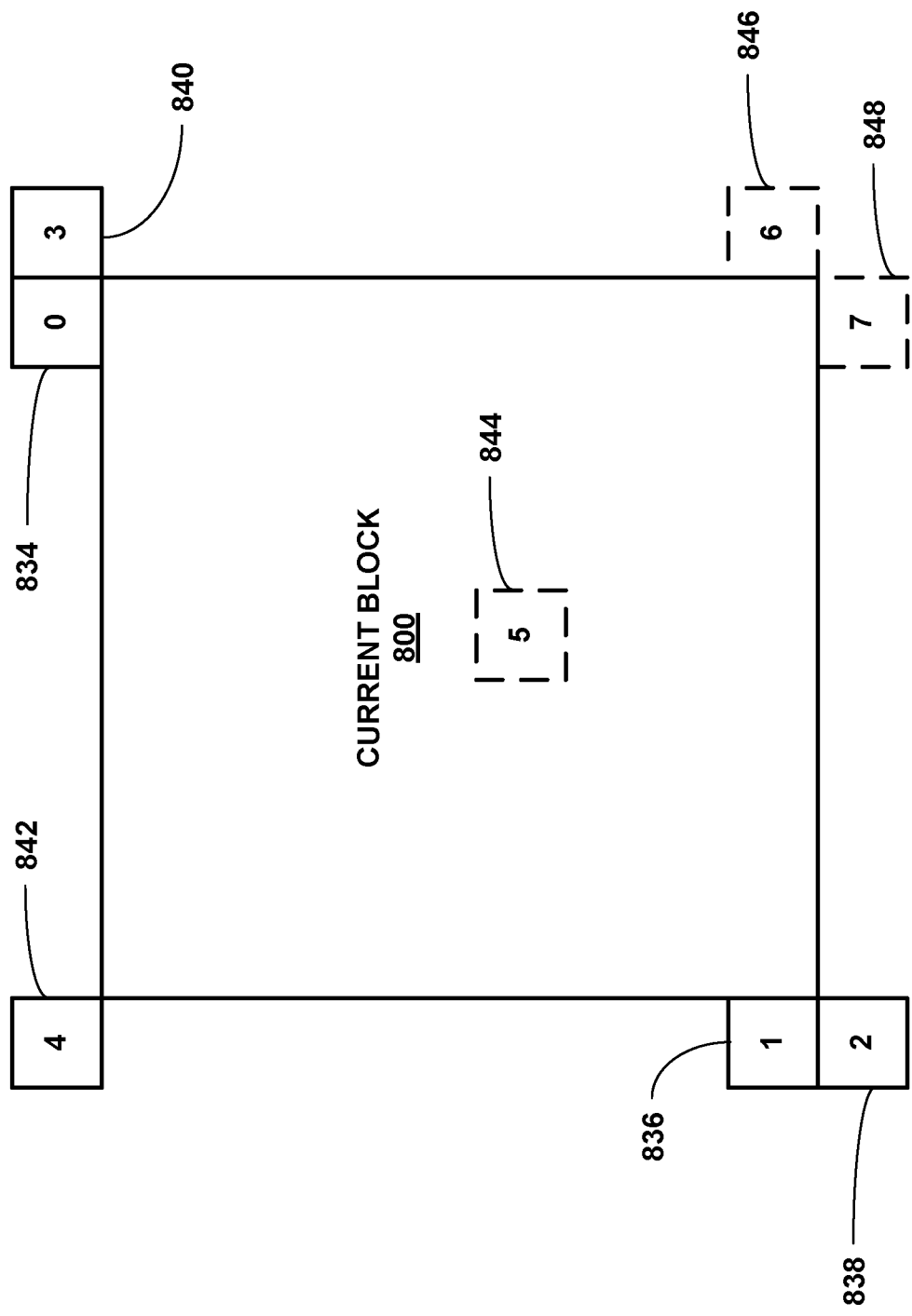
FIG. 8C is a conceptual diagram illustrating another example inverted spatial temporal motion vector predictor pattern according to one example of the disclosure.

As described in more detail, FIGS. 7A-7C illustrate some examples of spatially and temporally neighboring blocks that video encoder 200 and video decoder 300 evaluate for constructing motion vector predictor lists. There may be certain issues with constructing motion vector predictor lists using the techniques illustrated in FIGS. 7A-7C. As described in more detail, FIGS. 8A-8C illustrate some additional examples of constructing motion vector predictor lists that may address the issues of constructing motion vector predictor lists described with respect to FIGS. 7A-7C.

The following reviews CU structure and motion vector prediction in HEVC. In HEVC, the largest coding unit in a slice is called a coding tree block (CTB) or coding tree unit (CTU). A CTB contains a quad-tree, the nodes of which are coding units.

The size of a CTB can range from 16×16 to 64×64 in the HEVC main profile (although technically 8×8 CTB sizes can be supported). A coding unit (CU) could be the same size of a CTB to as small as 8×8. Each coding unit is coded with one mode, such as inter-coded or intra-coded. Inter-coded may also be referred to as inter-prediction coded or inter-predicted. Intra-coded may also be referred to as intra-prediction coded or intra-predicted.

When a CU is inter-coded, the CU may be further partitioned into 2 or 4 prediction units (PUs) or may be one PU when further partition is not applied. When two PUs are present in one CU, the PUs can be half size rectangles or two rectangle size with ¼ or ¾ size of the CU. When the CU is inter-coded, each PU has one set of motion information, which is derived with an inter-prediction mode.

The following reviews motion vector prediction. In the HEVC standard, there are two inter-prediction modes, named merge (skip is considered as a special case of merge) and advanced motion vector prediction (AMVP) modes, respectively, for a prediction unit (PU). In either AMVP or merge mode, a motion vector (MV) predictor list (also called MV candidate list) is maintained for multiple motion vector predictors. The motion vector predictor list may be referred to as motion vector predictor list. The motion vector(s), as well as reference indices in the merge mode, of the current PU are generated by taking one candidate from the motion vector predictor list. The motion vector predictor list may contain up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures used for the prediction of the current block, as well as the associated motion vectors are determined. In other words, the motion vector and the reference picture identified in the motion vector predictor list by the merge index are set equal to the motion vector and reference picture of the current block.

On the other hand, under AMVP mode, for each potential prediction direction from either list 0 or list 1, a reference index needs to be explicitly signaled, together with an MV predictor (MVP) index to the motion vector predictor list since the AMVP candidate contains only a motion vector. In AMVP mode, the predicted motion vectors can be further refined (e.g., based on a motion vector difference (MVD) described above). The candidates for both modes are derived similarly from the same spatial and temporal neighboring blocks.

Figure 4A:
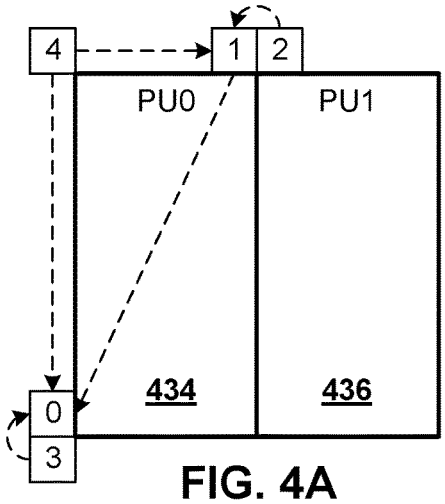
FIG. 4A is a conceptual diagram showing spatial neighboring candidates for merge mode.
Figure 4B:
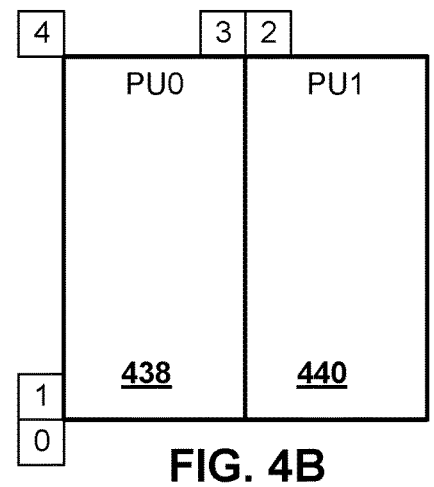
FIG. 4B is a conceptual diagram showing spatial neighboring candidates for advanced motion vector prediction (AMVP) mode.

The following reviews spatial neighboring blocks whose motion vector information forms as motion vector predictors (also called motion vector predictor candidates). In some examples, spatial MV candidates (e.g., spatial motion vector predictors) are derived from the neighboring blocks shown in FIGS. 4A and 4B for a specific PU ($PU_0$) 434 and 438, respectively, although the methods for generating the candidates from the blocks differ for merge and AMVP modes. FIG. 4A is a conceptual diagram showing spatial neighboring candidates for merge mode. FIG. 4B is a conceptual diagram showing spatial neighboring candidates for AMVP mode.

In merge mode, in some examples, up to five spatial MV candidates can be derived with the order showed in FIG. 4A, and the order is the following: left (0, A1), above (1, B1), above right (2, B0), below left (3, A0), and above left (4, B2), as shown in FIG. 4A. For instance, for PU0 434, block A1 is identified as 0 and is left of PU0 434, block B1 is identified as 1 and is above of PU0 434, block B0 is identified as 2 and is above right of PU0 434 and above PU1 436, block A0 is identified as 3 and is below left of PU0 434, and block B2 is identified as 4 and is above left of PU0 434.

In AMVP mode, in some examples, the neighboring blocks are divided into two groups: a left group that includes the block 0 and 1 that are below left and left of PU0 438, respectively, and an above group that includes the blocks 2, 3, and 4 that are above right, above, and above left of PU01 438 as shown in FIG. 4B. Block 2 is above PU1 440. For each group, the potential candidate in a neighboring block referring to the same reference picture as that indicated by the signaled reference index has the highest priority to be chosen to form a final candidate of the group. All neighboring blocks may not contain a motion vector pointing to the same reference picture. Therefore, if such a candidate cannot be found, the first available candidate may be scaled to form the final candidate, and thus the temporal distance differences can be compensated.

Figure 5A:
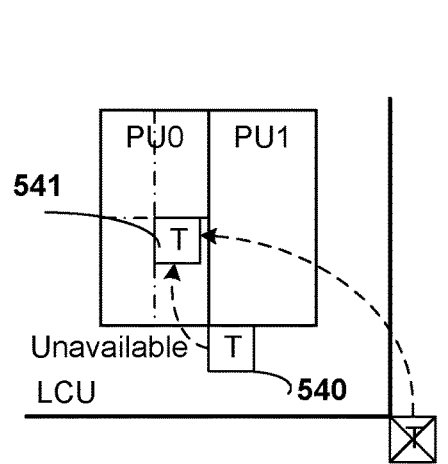
FIG. 5A is a conceptual diagram showing a temporal motion vector predictor (TMVP) candidate.
Figure 5B:
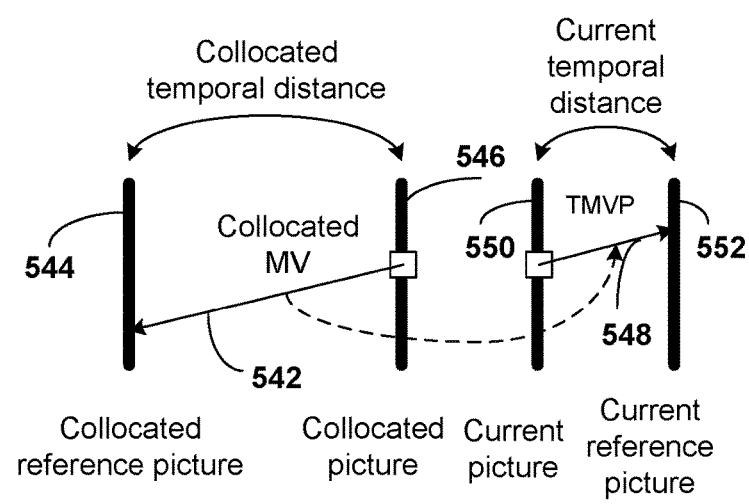
FIG. 5B is a conceptual diagram showing motion vector scaling for TMVP.

The following reviews temporal motion vector prediction with FIGS. 5A and 5B. FIG. 5A is a conceptual diagram showing a temporal motion vector predictor (TMVP) candidate. FIG. 5B is a conceptual diagram showing motion vector scaling for TMVP.

In some examples, a TMVP candidate, if enabled and available, is added into the MV candidate list (e.g., motion vector predictor list) after spatial motion vector candidates (e.g., motion vector information of spatially neighboring blocks). The process of motion vector derivation for TMVP candidate is the same for both merge and AMVP modes, however the target reference index for the TMVP candidate in merge mode is set to 0.

In some examples, the primary block location for TMVP candidate derivation is the bottom right block outside of the collocated PU as shown in FIG. 5A as a block T 540. The location of block T 540 may be to compensate the bias to the above and left blocks used to generate spatial neighboring candidates. However, if block T 540 is located outside of the current CTB row or motion information is not available for block T 540, block T 540 is substituted with a center block 541 of the PU.

In FIG. 5B, a motion vector 548 for TMVP candidate in current picture 550 is derived from the collocated PU of the collocated picture 546, indicated in the slice level. The motion vector (MV) for the collocated PU is called collocated MV 542. To derive the TMVP candidate motion vector, the collocated MV 542 may be scaled to compensate for the temporal distance differences, as shown in FIG. 5B. For instance, the temporal difference between collocated picture 546 and collocated reference picture 544 and the temporal difference between current picture 550 and current reference picture 552 is used to scale collocated MV 542 to generate motion vector 548.

The following reviews some other aspects of motion prediction in HEVC. Several aspects of merge and AMVP modes are described below.

Motion Vector Scaling:

The value of motion vectors can be proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated, and the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial Motion Vector Candidate Generation:

If a motion vector predictor list is not complete (e.g., fewer candidates than a predetermined number), artificial motion vector candidates are generated and inserted at the end of the motion vector predictor list until the motion vector predictor list has all candidates. In merge mode, there are two types of artificial MV candidates: combined candidate derived only for B-slices and zero candidates used only for AMVP if the combined candidate derived only for B-slices does not provide enough artificial candidates to fill the motion vector predictor list.

For each pair of candidates that are already in the motion vector predictor list and have the necessary motion information, bi-directional combined motion vector candidates are derived by a combination of the motion vector of the first candidate referring to a picture in the list 0 and the motion vector of a second candidate referring to a picture in the list 1.

Pruning Process for Candidate Insertion:

Candidates from different blocks may happen to be the same, which decreases the efficiency of a merge/AMVP motion vector predictor list. A pruning process is applied to address this problem. The pruning process compares one candidate against the others in the current motion vector predictor list to avoid inserting identical candidates. To reduce the complexity, only a limited number of pruning processes are applied to avoid comparing each potential candidate with all the other existing candidates in the list.

The development of VVC includes enhanced motion vector prediction. For example, several inter coding tools have been proposed which derive or refine the motion vector predictor list of motion vector prediction or merge prediction for a current block. Several examples are described below.

The following describes history-based motion prediction (HMVP), as described in L. Zhang, K. Zhang, H. Liu, Y. Wang, P. Zhao, and D. Hong, "CE4-related: History-based Motion Vector Prediction", JVET-K0104, July 2018. HMVP is a history-based method in which video encoder 200 and video decoder 300 determine an MV predictor for each block from a list of MVs decoded from the past, in addition to those MVs in immediately adjacent causal neighboring motion fields (e.g., MVs of immediately spatially neighboring blocks are examples of MVs in immediately adjacent causal neighboring motion fields). HMVP includes video encoder 200 and video decoder 300 constructing a table for previously decoded motion vectors as HMVP candidates.

For example, video encoder 200 and video decoder 300 construct a table with multiple HMVP candidates during the encoding/decoding process. Constructing the table may include adding HMVP candidates to the table as well as removing HMVP candidates from the table. Video encoder 200 and video decoder 300 may be configured to empty the table (e.g., remove the HMVP candidates) when a new slice is encountered for encoding or decoding. Whenever there is an inter-coded block, video encoder 200 and video decoder 300 may be configured to insert the associated motion information into the table in a first-in-first-out (FIFO) fashion as a new HMVP candidate. Then, video encoder 200 and video decoder 300 may be configured to apply a constraint FIFO rule. In some techniques, when inserting an HMVP candidate to the table, video encoder 200 and video decoder 300 may be configured to first apply a redundancy check (e.g., pruning) to determine whether there is an identical HMVP candidate in the table. If found, video encoder 200 and video decoder 300 may be configured to remove that particular HMVP candidate from the table and all the HMVP candidates after that candidate are moved.

Video encoder 200 and video decoder 300 may be configured to use HMVP candidates in the merge candidate list construction process. For example, video encoder 200 and video decoder 300 may be configured to insert all HMVP candidates from the last entry to the first entry in the table after the TMVP candidate. Video encoder 200 and video decoder 300 may be configured to apply pruning on the HMVP candidates. Once the total number of available merge candidates reaches the signaled or predetermined maximum number of allowed merge candidates, video encoder 200 and video decoder 300 may be configured to terminate the merge candidate list construction process. The merge candidate list construction is one example of constructing a motion vector predictor list.

Similarly, video encoder 200 and video decoder 300 may be configured to use HMVP candidates in the AMVP candidate list construction process to construct an AMVP candidate list. Video encoder 200 and video decoder 300 may be configured to insert the motion vectors of the last K HMVP candidates in the table after the TMVP candidate. Video encoder 200 and video decoder 300 may be configured to use only HMVP candidates with the same reference picture as the AMVP target reference picture to construct the AMVP candidate list. Video encoder 200 and video decoder 300 may be configured to apply pruning on the HMVP candidates. The AMVP candidate list construction is another example of constructing a motion vector predictor list.

Figure 6:
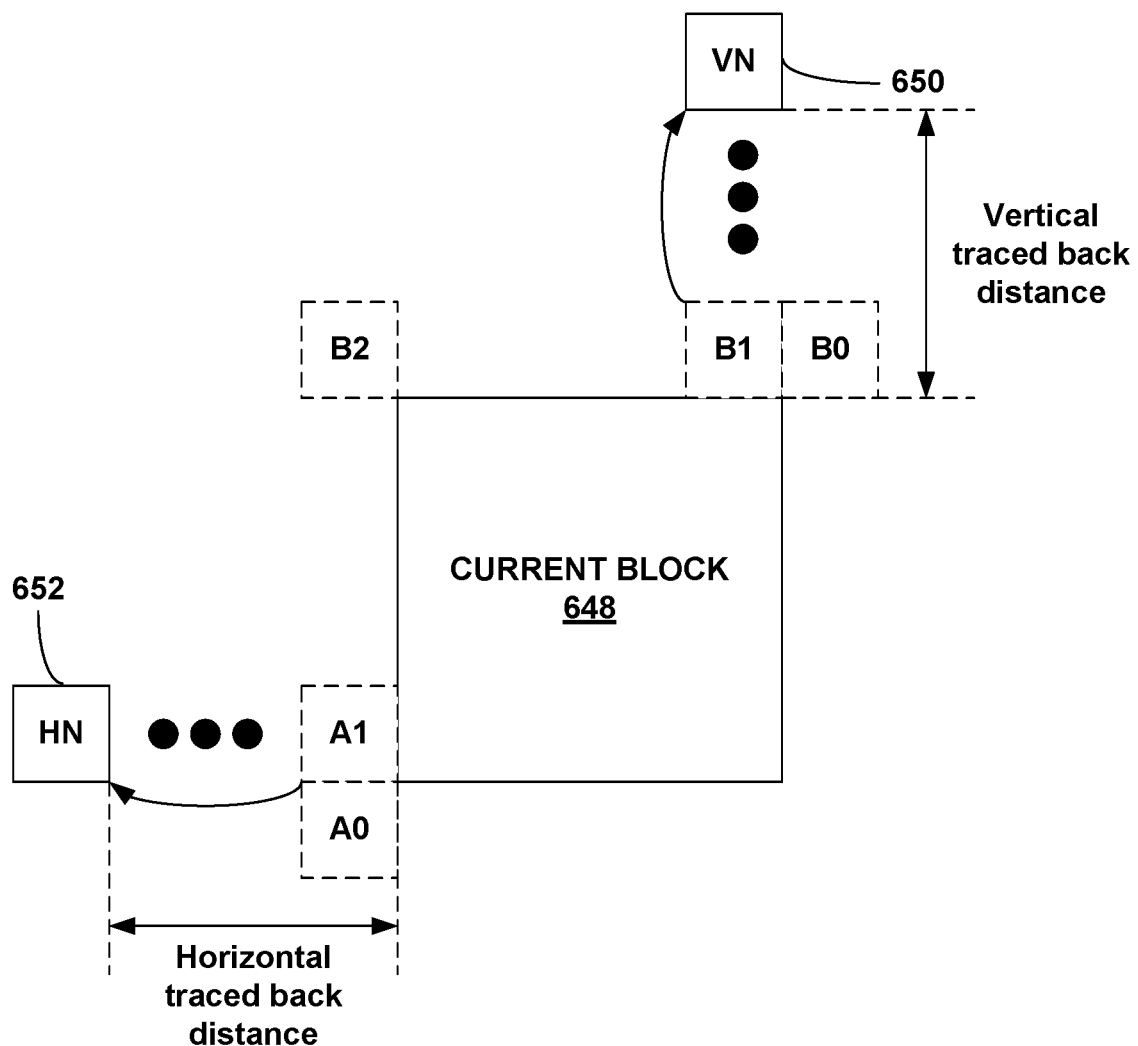
FIG. 6 is a conceptual diagram showing fetching of non-adjacent spatial merge candidates.

The following describes non-adjacent spatial merge candidates. The construction of non-adjacent spatial merge candidates, as described in R. Yu, et. al., "CE 4-2.1: Adding non-adjacent spatial merge candidates," Joint Video Experts Team (JVET) of ITU-T SG 16 WP 3 and ISO/IEC JTC 1/SC 29/WG 11, $11^{th}$ Meeting: Ljubljana, SI, 10-18 Jul. 2018 (hereinafter "JVET-K0228"), involves derivation of new spatial candidates from two non-adjacent neighboring positions. For example, as shown in FIG. 6, video encoder 200 and video decoder 300 may derive new spatial candidates from the closest non-adjacent block 650 above current block 648 and/or from the closest non-adjacent block 652 to the left of current block 648. For instance, FIG. 6 illustrates current block 648 with neighboring blocks A0, A1, B2, B1, and B0. In some examples, the non-adjacent spatial merge candidates include motion information of block HN 652 and block VN 650 of FIG. 6 that are not spatially neighboring to current block 648. That is, FIG. 6 illustrates examples of blocks whose motion vector information may be used to construct the HMVP candidate history table.

Blocks 650 and 652 are limited within a maximum distance of 1 CTU to the current block 648. The fetching process of non-adjacent candidates starts with tracing the previous decoded blocks in the vertical direction. The vertical inverse tracing stops when an inter block is encountered or the traced back distance reaches 1 CTU size.

The fetching process then traces the previous decoded blocks in the horizontal direction. The criterion for stopping the horizontal fetching process depends on whether there is a vertical non-adjacent candidate successfully being fetched or not. If no vertical non-adjacent candidate is fetched, the horizontal fetching process stops when an inter-coded block is encountered or the traced back distance exceeds one CTU size threshold. If there is a vertical non-adjacent candidate fetched, then the horizontal fetching process stops when an inter-coded block which contains a different MV from the vertical non-adjacent candidate is encountered or the traced back distance exceeds one CTU size threshold. The fetched non-adjacent neighboring candidates are added before the TMVP candidate in the merge candidate list.

As described above, for merge mode and AMVP mode, video encoder 200 and video decoder 300 may construct a motion vector (MV) candidate list, also called motion vector predictor list. The motion vector predictor list includes motion vector information of spatially neighboring blocks (e.g., blocks that neighbor the current block and are in the same picture as the current block), temporally neighboring blocks (e.g., blocks that neighbor the current block but are in the different picture than the current block), and, in some examples, motion vector information of HMVP candidates (e.g., entries from a table for previously decoded motion vectors that form the HMVP candidates). The temporally neighboring blocks are also called collocated blocks.

Therefore, to construct the motion vector predictor list, video encoder 200 and video decoder 300 may evaluate neighboring blocks (e.g., spatially and temporally neighboring blocks) to determine whether the neighboring blocks have motion vector information. If a neighboring block has motion vector information (e.g., because the neighboring block is inter-coded), video encoder 200 and video decoder 300 may include the motion vector information of neighboring block in the motion vector predictor list. Video encoder 200 and video decoder 300 may maintain a separate table of motion vector information of recently encoded or decoded blocks for the HMVP candidates.

There may be a plurality of neighboring blocks that video encoder 200 and video decoder 300 can evaluate (e.g., check) to determine whether the neighboring blocks have motion vector information. To limit the number of neighboring blocks that video encoder 200 and video decoder 300 may need to evaluate, the following describes some example design for spatial and temporal motion vector prediction (e.g., examples of blocks spatially and temporally neighboring blocks that are evaluated).

In some implementations of merge mode (in some terminology this can be called as skip or direct mode), the spatial and temporal motion vector predictor (MVP) candidates can be visited (e.g., checked) in a given order to populate the motion vector predictor list. A spatial MVP (SMVP) may be a motion vector of a spatially neighboring block that can be used as a motion vector predictor for the motion vector of the current block. A temporal MVP (TMVP), as described above, may be a motion vector for a temporally neighboring block (e.g., collocated block) that can be used as a motion vector predictor for the motion vector of the current block.

In some techniques, to determine the SMVPs and TMVPs, video encoder 200 and video decoder 300 may evaluate neighboring blocks (e.g., spatially or temporally neighboring blocks) in a particular order. The order in which video encoder 200 and video decoder 300 may evaluate neighboring blocks may also be referred to as a visiting order.

FIG. 7A is a conceptual diagram illustrating example spatial and temporal candidates used in motion vector prediction. FIG. 7B is a conceptual diagram illustrating an example visiting order for spatial candidates. FIG. 7C is a conceptual diagram illustrating another example visiting order for spatial candidates.

FIG. 7A shows example of spatial neighbors utilized as MVP candidates. In FIG. 7A the spatial neighbors (e.g., spatially neighboring blocks) of current block 700 include block A 702, B 704, (C 706, A1 710A|B1 710B), block A0 714, and block B2 712. Video encoder 200 and video decoder 300 may evaluate the neighboring blocks with a two-stage process. The order in which the spatial candidates (e.g., spatially neighboring blocks) are checked (i.e., the visiting order marked with numbers from 0-5), is shown in FIG. 7B.

Group 1 candidates of FIG. 7A include:
a. blocks A 702, B 704, C 706 (collocated with block B0 708 in HEVC notation) and are shown in hashed shading, and
b. blocks A1 710A or B1 710B, where block A1 710A or block B1 710B is included depending on whether the motion vector predictor in block C 706 is available.

Group 2 candidates include:
a. blocks A0 714 and B2 712

In FIG. 7A, block C 706 is collocated with block B0 708. For instance, block C 706 and block B0 708 may be the same blocks but two different names are given in FIG. 7A due to changes in naming between HEVC and VVC. The HEVC standard referred to the block illustrated as block B0 708 as block "B0." The VVC standard referred to the block illustrated as block B0 708 as block "C." Therefore, block C 706 is collocated with block B0 708 and is in the same picture as current block 700.

As an example of evaluating in accordance with Group 1 and Group 2, video encoder 200 and video decoder 300 may evaluate (e.g., check) blocks in Group 1. Video encoder 200 and video decoder 300 may evaluate block A 702 and determine whether there is motion vector information for block A 702. If there is motion vector information for block A 702 (e.g., because block A 702 was inter-coded with a motion vector), video encoder 200 and video decoder 300 may add motion vector information of block A 702 to the motion vector predictor list. Regardless of whether block A 702 has motion vector information, video encoder 200 and video decoder 300 may evaluate block B 704 and determine whether there is motion information for block B 704. If there is motion vector information for block B 704 (e.g., because block B 704 was inter-coded with a motion vector), video encoder 200 and video decoder 300 may add motion vector information of block B 704 to the motion vector predictor list. Regardless of whether block B 704 has motion vector information, video encoder 200 and video decoder 300 may evaluate block C 706 and determine whether there in motion information for block C 706. If there is motion vector information for block C 706 (e.g., because block C 706 was inter-coded with a motion vector), video encoder 200 and video decoder 300 may add motion vector information of block C 706 to the motion vector predictor list.

In some examples, video encoder 200 and video decoder 300 may evaluate one of block A1 710A or block B1 710B based on whether there was motion vector information for block C 706. For instance, if there is motion vector information for block C 706, then video encoder 200 and video decoder 300 may evaluate one of block A1 710A or block B1 710B (e.g., block A1 710A). However, if there is no motion vector information for block C 706 (e.g., because block C 706 was intra coded), then video encoder 200 and video decoder 300 may evaluate the other one of block A1 710A or block B1 710B (e.g., block B1 710B).

After evaluating one of blocks A1 710A or B1 710B, video encoder 200 and video decoder 300 may evaluate blocks of Group 2 (e.g., blocks B2 712 and A0 714) and add motion vector information to the motion vector predictor list, as described above. Then, video encoder 200 and video decoder 300 may evaluate the temporal neighbors (e.g., temporally neighboring blocks or collocated blocks).

In FIG. 7A, the temporal neighbors (e.g., temporally neighboring blocks) of current block 700 include block CO 716 and one or more of blocks 718. As shown in FIG. 7A, temporally collocated neighbors utilized as MVP candidates are from a block collocated at the center (marked as block CO 716) of the current block and a block 718A (with dashed outline) at the most bottom-right location outside of the current block. Block CO 716 and blocks 718 may be a reference picture that is different than the current picture that includes current block 700. Group 3 candidate blocks (shown with dashed outlines) include:

a. blocks CO 716, H 718A b. If H location (e.g., block H 718A) is found to be outside of the collocated picture, one or more fall back H positions (e.g., blocks H 718B-718D) can be used instead.

For instance, video encoder 200 and video decoder 300 may evaluate block CO 716 to determine whether there is motion vector information for block CO 716 and add the motion vector information for block CO 716 if available to the motion vector predictor list. Similarly, video encoder 200 and video decoder 300 may evaluate block H 718A to determine whether there is motion vector information for block H 718A and add the motion vector information for block H 718A if available to the motion vector predictor list. If block H 718A is not available (e.g., because it is outside of picture), video encoder 200 and video decoder 300 may evaluate one of blocks H 718B-718D.

The size of the motion vector predictor list may be fixed (i.e., there may be fixed number of entries in the motion vector predictor list). Accordingly, video encoder 200 and video decoder 300 may evaluate (e.g., check) neighboring blocks and add motion vector information to the motion vector predictor list of neighboring blocks as long as the maximum size of the motion vector predictor list is not reached. Also, if the size of the motion vector predictor list is not reached after evaluating temporally neighboring (e.g., collocated) blocks CO 716 and one of blocks H 718A-718D, video encoder 200 and video decoder 300 may add HMVP candidates to the motion vector predictor list or artificial motion vector candidates to the motion vector predictor list.

As described above, there may be an order in which video encoder 200 and video decoder 300 evaluates the neighboring blocks. FIG. 7B illustrates an example order. For instance, in FIG. 7B, "0" refers to block A 702, and is the first block that video encoder 200 and video decoder 300 may evaluate. "1" refers to block B 704, and is the second block that video encoder 200 and video decoder 300 may evaluate, and so forth.

In FIG. 7B, "3" refers to blocks A1 710A and B1 710B. This is to indicate that video encoder 200 and video decoder 300 may evaluate one of blocks A1 710A or B1 710B based on whether there is motion vector information for block C 706 (identified as "2").

In some example implementation, depending on the block partitioning used and the coding order, an inverse spatial MVP candidates order can be used, as shown in FIG. 7C, where the checking order proceeds from 0-5. For example, consistent with FIGS. 7A and 7B, if video encoder 200 and video decoder 300 encode or decode, respectively, using a left-to-right and top-to-bottom coding order for blocks in a picture, then blocks A 702, B 704, C 706, A1 710A, B1 701B, B2 712, and A0 714 would be encoded or decoded before current block 700 is encoded or decoded. Because blocks A 702, B 704, C 706, A1 710A, B1 701B, B2 712, and A0 714 would be encoded or decoded before current block 700 is encoded or decoded, for encoding or decoding current block 700, video encoder 200 and video decoder 300 may be able to evaluate motion vector information for blocks A 702, B 704, C 706, A1 710A, B1 701B, B2 712, and A0 714. For instance, because block A 702 was encoded or decoded before current block 700 in a left-to-right, top-to-bottom coding order, if block A 702 were inter-coded, video encoder 200 and video decoder 300 may be able to access the motion vector information for block A 702.

However, in some examples, the coding order may not be left-to-right and top-to-bottom. Rather, the coding order may be right-to-left and top-to-bottom. In such examples, some of the neighboring blocks illustrated in FIGS. 7A and 7B may not have been encoded or decoded before current block 700. Therefore, even if the neighboring block are to be inter-coded, the motion vector information for the neighboring blocks is not yet available because some of the neighboring blocks in FIGS. 7A and 7B would not have been encoded or decoded in the right-to-left coding order.

FIG. 7C illustrates an example of the spatially neighboring blocks that would be evaluated and the order in which the spatially neighboring blocks would be evaluated in a right-to-left and top-to-bottom coding order of blocks in the picture. For example, in FIG. 7C, video encoder 200 and video decoder 300 may evaluate blocks 720, 722, 724, one of blocks 726A or 726B, 728, and 730. For example, video encoder 200 and video decoder 300 may start evaluating, to determine whether there is motion vector information, starting from block 720 (identified as "0"), followed by block 722 (identified as "1"), and then block 724 (identified as "2").

Similar to blocks A1 710A and B1 710B of FIGS. 7A and 7B, in FIG. 7C, video encoder 200 and video decoder 300 may evaluate one of blocks 726A or 726B (both identified as "3") based on whether there is motion vector information for block 724 (e.g., based on whether block 724 is inter-coded or not). As illustrated, after one of blocks 726A or 726B, video encoder 200 and video decoder 300 may evaluate block 728 and then block 730.

The above describes an example order in which video encoder 200 and video decoder 300 may evaluate neighboring blocks to determine whether there is motion vector information that is to be included in the motion vector predictor list. In some examples, rather than evaluating one-by-one, it may be possible for video encoder 200 and video decoder 300 to evaluate a plurality of the neighboring blocks in parallel. In such examples, video encoder 200 and video decoder 300 may order the motion vector information in the motion vector predictor list in the order illustrated in FIGS. 7A-7C.

As an example, video encoder 200 and video decoder 300 may evaluate block A 702 and block B 704 in parallel, rather than one after the other. In this example, if both block A 702 and block B 704 have motion vector information, then video encoder 200 and video decoder 300 may construct the motion vector predictor list such that the motion vector information for block A 702 is before the motion vector information for block B 704 because block A 702 is before block B 704 in evaluation order.

However, in the examples illustrated in FIGS. 7A-7C, there may be a limit to evaluating motion vector information in parallel, which can impact computational efficiencies. For instance, whether block A1 710A or block B1 710B is to be evaluated is based on whether there is motion vector information for block C 706. In such examples, video encoder 200 and video decoder 300 may serially evaluate block C 706 and then one of block A1 710A or block B1 710B based on the result of evaluating block C 706 (e.g., based on whether there is motion vector information for block C 706). In FIG. 7C, rather than parallel evaluation, video encoder 200 and video decoder 300 may serially evaluate block 724 and then one of block 726A or block 726B based on the result of evaluating block 724 (e.g., based on whether there is motion vector information for block 724).

Similarly, whether video encoder 200 and video decoder 300 evaluate one of blocks H 718B-718D may be based on whether block 718A is available (e.g., not out of the picture). Although temporally neighboring blocks are not shown in FIG. 7C, the same can apply for temporally neighboring blocks as would apply for blocks H 718A-718D in FIG. 7A.

Stated another way, the MVP candidate designs, such as the pattern described in FIGS. 7A-7C, use conditional MVP fetching (A1|B1) (e.g., either block A1 710A or block B1 710B), based on availability of the certain MVP candidates (e.g., based on availability of motion vector information for block C 706 (also called C candidate availability)), block partitioning type or on the spatial position of the MVP candidate, such as selecting from a group of H candidates (e.g., blocks H 718A-718D) shown in FIG. 7A. Such conditional fetching increases computational complexity and may affect parallelization or memory constrains for certain implementation of MVP.

Constructing a motion vector predictor list, which, in some examples, may require a large number of dependencies and conditions, may introduce significant relative (per pixel) complexity, especially for small block sizes, e.g., 4×4 or 4×N, where N<=8. For smaller sized blocks, there may be not as much diversity in motion vector information for spatially neighboring blocks. For instance, a left neighboring block and an above neighboring block to the current block may be more proximate to one another for a smaller sized block than for a larger sized block. As an illustration, in FIG. 7A, the larger the current block 700 is, the further away block A 702 and block B0 708 are from another, and the smaller the current block 700 is, the closer block A 702 and block B0 708 are to another.

Two blocks that are closer to one another tend to have similar motion vector information. Therefore, for smaller sized blocks, there is a higher likelihood that the spatially neighboring blocks have similar motion vector information as compared to spatially neighboring blocks for larger sized blocks. Because there is a higher likelihood that the spatially neighboring blocks have similar motion vector information, having a relatively large sized motion vector predictor list may not provide diversity in motion vector information. In other words, although having a relatively large sized motion vector predictor list for smaller sized blocks may provide many motion vector predictor candidates, the diversity in the motion vector information may not be big. However, for larger sized blocks, having a relatively large motion vector predictor list may provide diverse motion vector information allowing for the inclusion of motion vector predictor candidates having values relatively close to the actual motion vector.

Accordingly, having the same sized motion vector predictor list for blocks of all sizes may not be desirable. For small sized blocks, having a motion vector predictor list that is the same size as that of a large sized block means that video encoder 200 and video decoder 300 need to perform multiple operations to fill in the motion vector predictor list without achieving coding gains from having multiple motion vector predictor candidates because of the lack of diversity in the motion vector information. Therefore, for smaller sized blocks, a smaller sized motion vector predictor list may be beneficial. However, for a larger sized block, having a relatively small sized motion vector predictor list may be disadvantageous because diverse motion vector predictor candidates may be left out of the motion vector predictor list due to the small size of the motion vector predictor list.

In view of these drawbacks, this disclosure describes the following techniques for performing spatio-temporal motion vector predictor list construction. The example techniques may be applied separately or in combination. Also, the example techniques may address the issues described above. However, the example techniques should not be considered as limited to addressing the issues described above.

In one example, this disclosure describes techniques for determining the pattern in which spatial and temporal MVP candidates are generated. Video encoder 200 and video decoder 300 may employ the following motion vector predictor list construction process from spatial-temporal neighborhood candidates. The priority of the candidates' placement in the motion vector predictor list is marked by the number from 0 . . . 7, as shown in FIG. 8A.

First, video encoder 200 and video decoder 300 visits (i.e., checks the availability of motion information) in spatial MVP candidates in the order 0 . . . 4 shown in solid lined blocks in FIG. 8A. For example, video encoder 200 and video decoder 300 may determine whether motion vector information is available for block 0 802, block 1 804, block 2 806, block 3 808, and block 4 810.

Next, video encoder 200 and video decoder 300 visits (i.e., checks the availability of motion information) the motion vector predictor candidates from temporal collocated positions (5, 6, and 7), which are shown as dashed lined blocks. For example, video encoder 200 and video decoder 300 may determine whether motion vector information is available for block 5 812, also called center collocated block 5 812, or block 6 814, also called below collocated block 6 814 (where below collocated block 6 814 may be bottom and closest to the right of current block 800 of FIG. 8A), or block 7 816, also called right collocated block 7 816 (where right collocated block 7 816 may be right and closest to the bottom of current block 800 of FIG. 8B).

FIG. 8A is a conceptual diagram illustrating an example spatial temporal motion vector predictor pattern according to one example of the disclosure. FIG. 8B is a conceptual diagram illustrating an example inverted spatial temporal motion vector predictor pattern according to one example of the disclosure. FIG. 8C is a conceptual diagram illustrating another example inverted spatial temporal motion vector predictor pattern according to one example of the disclosure. FIGS. 8A-8C show different checking orders (e.g., as indicated by the numbers in the blocks) as well as different locations for temporal collocated blocks (e.g., as shown by the dashed lined blocks).

Depending on the coding mode, type of partitioning, and/or coding direction, especially coding modes that involve inverse scan order processing, the spatially inverted (or mirrored) pattern can be employed, as shown in FIG. 8B. In some example, part of the patterns shown in FIG. 8A can be inverted, e.g. only spatial positions are inverted, and temporal candidate locations remain the same. In yet another example, the pattern (e.g., the relative location) of MVP candidates may remain the same. However, the visiting order may be spatially inverted (mirrored) along certain axis (e.g., diagonal axis) as shown in FIG. 8C.

In one or more examples, video encoder 200 and video decoder 300 may each construct a motion vector predictor list based on coding order of the picture that includes current block 800. One example of the coding order is left-to-right coding order, in which case, video encoder 200 and video decoder 300 encode or decode block-by-block starting from the top-left corner of the current picture until reaching the right end of the current picture, followed by the block below the top-left corner, and so on until reaching the block located at the bottom-right. Another example of the coding order is right-to-left coding order, in which case, video encoder 200 and video decoder 300 can encode or decode block-by-block starting from the top-right corner of the current picture until reaching the left end of the current picture, followed by the block below the top-right corner, and so on until reaching the block located at the bottom-left.

The coding order may impact which spatially neighboring blocks are available for checking. For instance, the motion vector information of only the previously encoded or decoded blocks may be available. Therefore, if a block is yet to be encoded or decoded, the motion vector information for that block may not yet be available. Because the coding order defines the order in which blocks are encoded or decoded, whether the motion vector information of a spatially neighboring block can be determined is based on the coding order.

As an example, in FIG. 8A, for left-to-right coding order, the motion vector information of block 0 802 may be available at the time of encoding or decoding current block 800. However, the motion vector information of a right neighboring block to current block 800 may not be available. In FIG. 8B, for right-to-left coding order, the motion vector information of block 0 818 may be available at the time of encoding or decoding current block 800. However, the motion vector information of a left neighboring block current block 800 may not be available.

In one or more examples, for a first block, in a first picture having a left-to-right coding order, video encoder 200 and video decoder 300 may construct a first motion vector predictor list. As illustrated in FIG. 8A, a first entry in the first motion vector predictor list is based on motion vector information of a left neighboring block to the first block (e.g., block 0 802). The left neighboring block to the first block may be a block left of the first block having a bottom boundary that is same as a bottom boundary of the first block. For a second block, in a second picture having a left-to-right coding order, video encoder 200 and video decoder 300 may construct a second motion vector predictor list. As illustrated in FIG. 8B, a first entry in the second motion vector predictor list is based on motion vector information of a right neighboring block to the second block (e.g., block 0 818). The right neighboring block to the second block may be a block right of the second block having a bottom boundary that is same as a bottom boundary of the second block.

As illustrated, block 0 802 is left of current block 800 of FIG. 8A. In some examples, block 0 802 may be located to the left of current block 800 of FIG. 8A such that the bottom boundary of block 0 802 is the same as the bottom boundary of current block 800 of FIG. 8A. As illustrated, block 0 818 is right of current block 800 of FIG. 8B. In some examples, block 0 818 may be located to the right of current block 800 of FIG. 8B such that the bottom boundary of block 0 818 is the same as the bottom boundary of current block 800 of FIG. 8B.

For the first motion vector predictor list, the entries in the first motion vector predictor list may be as follows: first entry is left neighboring block 0 802, second entry is top neighboring block 1 802, third entry is top-right neighboring block 2 806, fourth entry is bottom-left neighboring block 3 808, and fifth entry is top-left neighboring block 4 810. In some examples, top neighboring block 1 802 may be top of current block 800 of FIG. 8A and share a right boundary with current block 800 of FIG. 8A.

For the second motion vector predictor list, the entries in the second motion vector predictor list may be as follows: first entry is right neighboring block 0 818, second entry is top neighboring block 1 820, third entry is top-left neighboring block 2 822, fourth entry is bottom-right neighboring block 3 824, and fifth entry is top-right neighboring block 4 826. In some examples, top neighboring block 1 820 may be top of current block 800 of FIG. 8B and share a left boundary with current block 800, of FIG. 8B.

In some examples, after checking the spatially neighboring blocks, video encoder 200 and video decoder 300 may check collocated blocks. In one example, video encoder 200 and video decoder 300 may check center collocated block 5 812. If motion vector information for center collocated block 5 812 is available, video encoder 200 and video decoder 300 may add the motion vector information to the motion vector predictor list and not add motion vector information from any other collocated block.

If motion vector information for center collocated block 5 812 is not available, video encoder 200 and video decoder 300 may check bottom collocated block 6 814. If motion vector information for bottom collocated block 6 814 is available, video encoder 200 and video decoder 300 may add the motion vector information to the motion vector predictor list and not add motion vector information from any other collocated block. As illustrated, bottom collocated block 6 814 may be a block that is bottom and closest to the right of current block 800 (e.g., block 6 814 is below current block 800 of FIG. 8A and the right boundary of block 6 814 is the same as the right boundary of current block 800 of FIG. 8A). The coordinates for block 6 814 may be (xColBot, yColBot), where xColBot=xCb+cbWidth−1, and yColBot=yCb+cbHeight, where (xCb, yCb) are the coordinates for current block 800 of FIG. 8A, cbWidth is the width of current block 800 of FIG. 8A, and cbHeight is the height of current block 800 of FIG. 8A.

If motion vector information for bottom collocated block 6 814 is not available, video encoder 200 and video decoder 300 may check right collocated block 7 816. If motion vector information for right collocated block 7 816 is available, video encoder 200 and video decoder 300 may add the motion vector information to the motion vector predictor list and not add motion vector information from any other collocated block. As illustrated, right collocated block 7 816 may be a block right and closest to the bottom of current block 800 of FIG. 8A (e.g., block 7 816 is right of current block 800 of FIG. 8A and the bottom boundary of block 7 816 is the same as the bottom boundary of current block 800 of FIG. 8A). The coordinates for block 7 816 may be (xColBr, yColBr), where xColBr=xCb+cbWidth, and yColBr=yCb+cbHeight−1, where (xCb, yCb) are the coordinates for current block 800 of FIG. 8A, cbWidth is the width of current block 800 of FIG. 8A, and cbHeight is the height of current block 800 of FIG. 8A.

In another example, video encoder 200 and video decoder 300 may check center collocated block 5 828. If motion vector information for center collocated block 5 828 is available, video encoder 200 and video decoder 300 may add the motion vector information to the motion vector predictor list and not add motion vector information from any other collocated block.

If motion vector information for center collocated block 5 828 is not available, video encoder 200 and video decoder 300 may check bottom collocated block 6 830. If motion vector information for bottom collocated block 6 830 is available, video encoder 200 and video decoder 300 may add the motion vector information to the motion vector predictor list and not add motion vector information from any other collocated block. As illustrated, bottom collocated block 6 830 may be a block that is bottom and closest to the left of current block 800 (e.g., block 6 830 is below current block 800 of FIG. 8B and the left boundary of block 6 830 is the same as the left boundary of current block 800 of FIG. 8B). The coordinates for block 6 830 may be (xColBot, yColBot), where xColBot=xCb, and yColBot=yCb+ cbHeight, where (xCb, yCb) are the coordinates for current block 800 of FIG. 8B, cbWidth is the width of current block 800 of FIG. 8B, and cbHeight is the height of current block 800 of FIG. 8B.

If motion vector information for bottom collocated block 6 830 is not available, video encoder 200 and video decoder 300 may check left collocated block 7 832. If motion vector information for left collocated block 7 832 is available, video encoder 200 and video decoder 300 may add the motion vector information to the motion vector predictor list and not add motion vector information from any other collocated block. As illustrated, left collocated block 7 832 may be a block left and closest to the bottom of current block 800 of FIG. 8B (e.g., block 7 832 is left of current block 800 of FIG. 8B and the bottom boundary of block 7 832 is the same as the bottom boundary of current block 800 of FIG. 8B). The coordinates for block 7 832 may be (xColBr, yColBr), where xColBr=xCb-1, and yColBr=yCb+ cbHeight-1, where (xCb, yCb) are the coordinates for current block 800 of FIG. 8B, cbWidth is the width of current block 800 of FIG. 8B, and cbHeight is the height of current block 800 of FIG. 8B.

It should be understood that the positions of spatially neighboring and collocated blocks in FIGS. 8A and 8B are one example and should not be considered limiting. For example, block 802 may be located generally on the left of current block 800 of FIG. 8A and block 818 may be located generally on the right of current block 800 of FIG. 8B. The same would apply to the other spatially and collocated blocks.

The above example describes example ways in which video encoder 200 and video decoder 300 order the motion vector information in the motion vector predictor list. In some examples, although video encoder 200 and video decoder 300 order the motion vector information, if available, in the motion vector predictor list in a particular order, video encoder 200 and video decoder 300 may be configured to access the motion vector information of the neighboring blocks (e.g., spatially neighboring blocks 0 . . . 4 in FIGS. 8A and 8B) in parallel. In other words, video encoder 200 and video decoder 300 may check motion vector information for a plurality of (e.g., all) spatially neighboring blocks used to construct the motion vector predictor list in parallel.

For instance, this disclosure describes techniques for the inclusion of a motion vector predictor candidate to a motion vector predictor list. The following process of motion vector predictor list construction is described. Video encoder 200 and video decoder 300 may check motion vector predictor candidate positions (e.g., all spatially neighboring blocks) in unconditional order and independent from availability of the other motion vector predictor candidates. Thus, motion vector predictor candidate checking can be performed in parallel.

Video encoder 200 and video decoder 300 may check a neighboring block if the position of the neighboring block is within the picture boundary. Also, video encoder 200 and video decoder 300 may check a neighboring block that is at a position such that the neighboring block was already encoded or decoded. Moreover, video encoder 200 and video decoder 300 may determine whether motion vector information is available for the neighboring block. If the above example conditions are satisfied, video encoder 200 and video decoder 300 may include the motion vector information of a neighboring block in the motion vector predictor list.

As described above, there may be a maximum size of the motion vector predictor list. For example, fetched motion vector predictor candidates may be included in the motion vector predictor list until the effective size of the motion vector predictor list reaches a specified upper boundary value, e.g., specified by MAX_MVP_LIST_SIZE that defines the maximum size of the motion vector predictor list. In some examples, the value of the MAX_MVP_LIST_SIZE can be equal to 6.

However, as described above, having the same maximum size of list for all blocks without consideration of the block size may result in motion vector predictor lists that are unnecessarily complex to construct or do not include sufficient candidates. For instance, as described above, for smaller sized blocks, to reduce computation cycles, it may be beneficial to have smaller sized motion vector predictor lists since additional candidates may not provide much coding gains. However, for larger sized blocks, to ensure good diversity in the motion vector information, it may be beneficial to have larger sized motion vector predictor lists.

In one example, video encoder 200 and video decoder 300 may be configured to determine and/or limit the maximum effective size of the constructed motion vector predictor list depending on the current coded block size. In some examples, for blocks that include 4×N or N×4 number of pixels, where N<=8, the effective MVP list size is set to be equal to SMAL_BLOCK_MAX_MVP_LIST<MAX_MVP_LIST_SIZE. The variable SMAL_BLOCK_MAX_MVP_LIST defines the maximum size of the motion vector predictor list for smaller sized blocks, where smaller sized blocks may be blocks that have samples less than or equal to 4×N or N×4 and N is 8.

To indicate whether a current block is a small sized block, video encoder 200 and/or video decoder 300 may determine a smallBlockFlag (e.g., binary value that indicates if block is small or not). The equation to determine smallBlockFlag may be smallBlockFlag= (cuw*cuh<SMALL_BLOCK_SIZE); SMALL_BLOCK_SIZE=32, where cuw is the width of the current block and cuh is the height of the current block.

In some examples, the criteria of small block sizes SMALL_BLOCK_SIZE can be defined as being equal to 16 pixels. Accordingly, the example of 32 for small block size is merely one example and values other than 32 and 16 are contemplated by this disclosure for small block size.

In some examples, the value of the MAX_MVP_LIST_SIZE can be equal to 4. That is, for small sized blocks, the maximum size of the motion vector predictor list may be four. In some examples, the criterion of small block sizes can be expressed through the value of block edges lengths:

--- smallBlockFlag = ((max(cuw, cuh) <= 8 && min(cuw, cuh) < 8))
if (smallBlockFlag)
    use SMAL_BLOCK_MAX_MVP_LIST;
else
    use
    MAX_MVP_LIST_SIZE

---

In another example, this disclosure describes techniques for the signaling of motion vector predictor candidates list parameters. For example, the maximal possible motion vector predictor list size (MAX_MVP_LIST_SIZE) can be specified at the decoder side (e.g., video decoder 300) as a side information (e.g., signaled information from video encoder 200).

In some examples, the maximum motion vector predictor list size effectively used by an application (e.g., MAX_MVP_LIST_SIZE and/or SMAL_BLOCK_MAX_MVP_LIST) for current coding conditions, e.g., for current sequence, picture, slice, or group of CUs, may be signalled by syntax elements of the bitstream, e.g., at the sequence/picture/slice header or other level.

In some examples, parameters of the block size dependency, e.g., SMALL_BLOCK_SIZE, are specified at the decoder side as a side information. In another example, this parameter may be signalled through the bitstream.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266/VVC video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, motion estimation unit 222 and motion compensation unit 224 may perform inter-prediction and motion vector prediction techniques described in this disclosure. For example, as will be explained in more detail below, motion estimation unit 222 and motion compensation unit 224 may be configured to construct a motion vector predictor list utilizing the example techniques described in this disclosure.

As described above, in some examples, the motion vector predictor list for a block may be based on the coding order of the picture that includes the block and the spatially neighboring blocks and/or collocated blocks. For instance, in one example, the five spatially neighboring blocks may be those illustrated in FIG. 8A for a left-to-right coding order and the five spatially neighboring blocks may be those illustrated in FIG. 8B for a right-to-left coding order.

For instance, for a first block, in a first picture having a left-to-right coding order, motion estimation unit 222 and motion compensation unit 224 may construct a first motion vector predictor list. A first entry in the first motion vector predictor list may be based on motion vector information of a left neighboring block to the first block (e.g., block 0 802 of FIG. 8A). For a second block, in a second picture having a right-to-left coding order, motion estimation unit 222 and motion compensation unit 224 may construct a second motion vector predictor list. A first entry in the second motion vector predictor list may be based on motion vector information of a right neighboring block to the second block (e.g., block 0 818 of FIG. 8B).

Motion estimation unit 222 and motion compensation unit 224 may check motion vector information stored in video data memory 230 or decoded picture buffer 218 (as two examples) for a plurality, including all, of the spatially neighboring blocks in parallel. In other words, whether motion estimation unit 222 and motion compensation unit 224 check motion vector information for a particular spatially neighboring block may not be dependent upon motion vector information of any other block.

Based on the checking of the motion vector information of the spatially neighboring blocks, motion estimation unit 222 and motion compensation unit 224 may construct a motion vector predictor list having motion vector information in an order based on availability of the motion vector information. The order of the motion vector information in the motion vector predictor list for a left-to-right coding order may be: motion vector information of the left neighboring block (e.g., block 0 802 of FIG. 8A), motion vector information of an above neighboring block (e.g., block 1 804 of FIG. 8A), motion vector information of an above-right neighboring block (e.g., block 2 806 of FIG. 8A), motion vector information of a below-left neighboring block (e.g., block 3 808 of FIG. 8A), and motion vector information of an above-left neighboring block (e.g., block 4 810 of FIG. 8A). The order of the motion vector information in the motion vector predictor list for a right-to-left coding order may be: motion vector information of the right neighboring block (e.g., block 0 818 of FIG. 8B), motion vector information of an above neighboring block (e.g., block 1 820 of FIG. 8B), motion vector information of an above-left neighboring block (e.g., block 2 822 of FIG. 8B), motion vector information of a below-right neighboring block (e.g., block 3 824 of FIG. 8B), and motion vector information of an above-right neighboring block (e.g., block 4 826 of FIG. 8B).

The above ordering is based on the availability of the motion vector information. If motion vector information is not available for a particular block, then that motion vector information is not added to the motion vector predictor list. In some examples, the next available motion vector information may be included in the space reserved for the block for which there was not any motion vector information. For example, motion vector information for block 1 804 of FIG. 8A may be the second entry in the motion vector predictor list, and motion vector information for block 2 806 of FIG. 8A may be the third entry in the motion vector predictor list. If motion vector information for block 1 804 of FIG. 8A is not available and motion vector information for block 2 806 of FIG. A is available, then motion vector information for block 2 806 may be in the second entry of the motion vector predictor list.

In the above example, motion estimation unit 222 and motion compensation unit 224 determined a first motion vector predictor list and a second motion vector predictor list based on spatially neighboring blocks. In some examples, motion estimation unit 222 and motion compensation unit 224 may include motion vector information, stored in video data memory 230 or decoded picture buffer 218 (as two examples), of collocated blocks in the first motion vector predictor list and the second motion vector predictor list.

As one example, motion estimation unit 222 and motion compensation unit 224 may determine whether motion vector information for a center collocated block located in a picture other than the first picture (e.g., block 5 812 of FIG. 8A) is available before determining whether motion vector information in any other collocated block located in the picture other than the first picture is available, and based on the motion vector information for the center collocated block being available, motion estimation unit 222 and motion compensation unit 224 may add the motion vector information for the center collocated block to the first motion vector predictor list.

In some examples, motion estimation unit 222 and motion compensation unit 224 may determine that motion vector information for a center collocated block located in a picture other than the first picture is not available. In such examples, subsequent to determining that the motion vector information for the center collocated block is not available, motion estimation unit 222 and motion compensation unit 224 may determine whether motion vector information for a bottom collocated block located in the picture other than the first picture is available (e.g., block 6 814 of FIG. 8A), and based on the motion vector information for the bottom collocated block being available, motion estimation unit 222 and motion compensation unit 224 may add the motion vector information for the bottom collocated block to the first motion vector predictor list.

In some examples, motion estimation unit 222 and motion compensation unit 224 may determine that motion vector information for a center collocated block located in a picture other than the first picture is not available. In some cases, subsequent to determining that the motion vector information for the center collocated block is not available, motion estimation unit 222 and motion compensation unit 224 may determine that motion vector information for a bottom collocated block located in the picture other than the first picture is not available. In such cases, subsequent to determining that the motion vector information for the bottom collocated block is not available, motion estimation unit 222 and motion compensation unit 224 may determine whether motion vector information for a right collocated block located in the picture other than the first picture is available (e.g., block 7 816 of FIG. 8A), and based on the motion vector information for the right collocated block being available, motion estimation unit 222 and motion compensation unit 224 may add the motion vector information for the right collocated block to the first motion vector predictor list.

Motion estimation unit 222 and motion compensation unit 224 may perform similar operations for adding motion vector information for collocated blocks for constructing the second motion vector predictor list. However, for the second motion vector predictor list, motion estimation unit 222 and motion compensation unit 224 may add motion vector information based on the availability of center collocated block 5 828, bottom collocated block 6 830, and left collocated block 7 832 of FIG. 8B.

In constructing motion vector predictor lists, motion estimation unit 222 and motion compensation unit 224 may construct the motion vector predictor lists based on size of the block, in some examples. For instance, motion estimation unit 222 and motion compensation unit 224 may construct the first motion vector predictor list, having a first maximum size, based on the first block having a size greater than a threshold size. Motion estimation unit 222 and motion compensation unit 224 may construct a third motion vector predictor list, having a second maximum size that is less than the first maximum size, for a third block in the first picture based on the third block having a size less than the threshold size. As one example, the first maximum size equals six, the second maximum size equals four, and the threshold size equals N×4 or 4×N, where N is less than or equal to eight.

Motion estimation unit 222 and motion compensation unit 224 may be configured to encode the first block and the second block. For example, motion estimation unit 222 and motion compensation unit 224 may determine a prediction block for the first block and determine a motion vector for the first block that identifies the prediction block. Motion estimation unit 222 and motion compensation unit 224 may determine an entry in the first motion vector predictor list based on the motion vector. Motion estimation unit 222 and motion compensation unit 224 may cause entropy encoding unit 220 to signal information indicative of the entry in the first motion vector predictor list. In addition, residual generation unit 204 may determine residual data representing a difference between the first block and the prediction block. Entropy encoding unit 220 may signal information indicative of the residual data. Motion estimation unit 222 and motion compensation unit 224 may perform similar operations to encode the second block using the second motion vector predictor list.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of H.266/VVC, JEM, and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random-access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

In accordance with the techniques of this disclosure, motion compensation unit 316 may perform inter-prediction and motion vector prediction techniques when coding a block described in this disclosure. For example, as will be explained in more detail below, motion compensation unit 316 may be configured to construct a motion vector predictor list utilizing the example techniques described in this disclosure.

As described above, in some examples, the motion vector predictor list for a block may be based on the coding order of the picture that includes the block and the spatially neighboring blocks and/or collocated blocks. For instance, in one example, the five spatially neighboring blocks may be the those illustrated in FIG. 8A for a left-to-right coding order and the five spatially neighboring blocks may be those illustrated in FIG. 8B for a right-to-left coding order.

For instance, for a first block, in a first picture having a left-to-right coding order, motion compensation unit 316 may construct a first motion vector predictor list. A first entry in the first motion vector predictor list may be based on motion vector information of a left neighboring block to the first block (e.g., block 0 802 of FIG. 8A). For a second block, in a second picture having a right-to-left coding order, motion compensation unit 316 may construct a second motion vector predictor list. A first entry in the second motion vector predictor list may be based on motion vector information of a right neighboring block to the second block (e.g., block 0 818 of FIG. 8B).

Motion compensation unit 316 may check motion vector information stored in decoded picture buffer 314 (as one example) for a plurality, including all, of the spatially neighboring blocks in parallel. In other words, whether motion compensation unit 316 check motion vector information for a particular spatially neighboring block may not be dependent upon motion vector information of any other block.

Based on the checking of the motion vector information of the spatially neighboring blocks, motion compensation unit 316 may construct a motion vector predictor list having motion vector information in an order based on availability of the motion vector information. The order of the motion vector information in the motion vector predictor list for a left-to-right coding order may be: motion vector information of the left neighboring block (e.g., block 0 802 of FIG. 8A), motion vector information of an above neighboring block (e.g., block 1 804 of FIG. 8A), motion vector information of an above-right neighboring block (e.g., block 2 806 of FIG. 8A), motion vector information of a below-left neighboring block (e.g., block 3 808 of FIG. 8A), and motion vector information of an above-left neighboring block (e.g., block 4 810 of FIG. 8A). The order of the motion vector information in the motion vector predictor list for a right-to-left coding order may be: motion vector information of the right neighboring block (e.g., block 0 818 of FIG. 8B), motion vector information of an above neighboring block (e.g., block 1 820 of FIG. 8B), motion vector information of an above-left neighboring block (e.g., block 2 822 of FIG. 8B), motion vector information of a below-right neighboring block (e.g., block 3 824 of FIG. 8B), and motion vector information of an above-right eft neighboring block (e.g., block 4 826 of FIG. 8B).

The above ordering is based on the availability of the motion vector information. If motion vector information is not available for a particular block, then that motion vector information is not added to the motion vector predictor list. In some examples, the next available motion vector information may be included in the space reserved for the block for which there was not any motion vector information. For example, motion vector information for block 1 804 of FIG. 8A may be the second entry in the motion vector predictor list, and motion vector information for block 2 806 of FIG. 8A may be the third entry in the motion vector predictor list. If motion vector information for block 1 804 of FIG. 8A is not available and motion vector information for block 2 806 of FIG. A is available, then motion vector information for block 2 806 may be in the second entry of the motion vector predictor list.

In the above example, motion compensation unit 316 determined a first motion vector predictor list and a second motion vector predictor list based on spatially neighboring blocks. In some examples, motion compensation unit 316 may include motion vector information, stored in decoded picture buffer 314 (as one example), of collocated blocks in the first motion vector predictor list and the second motion vector predictor list.

As one example, motion compensation unit 316 may determine whether motion vector information for a center collocated block located in a picture other than the first picture (e.g., block 5 812 of FIG. 8A) is available before determining whether motion vector information in any other collocated block located in the picture other than the first picture is available, and based on the motion vector information for the center collocated block being available, motion compensation unit 316 may add the motion vector information for the center collocated block to the first motion vector predictor list.

In some examples, motion compensation unit 316 may determine that motion vector information for a center collocated block located in a picture other than the first picture is not available. In such examples, subsequent to determining that the motion vector information for the center collocated block is not available, motion compensation unit 316 may determine whether motion vector information for a bottom collocated block located in the picture other than the first picture is available (e.g., block 6 814 of FIG. 8A), and based on the motion vector information for the bottom collocated block being available, motion compensation unit 316 may add the motion vector information for the bottom collocated block to the first motion vector predictor list.

In some examples, motion compensation unit 316 may determine that motion vector information for a center collocated block located in a picture other than the first picture is not available. In some cases, subsequent to determining that the motion vector information for the center collocated block is not available, motion compensation unit 316 may determine that motion vector information for a bottom collocated block located in the picture other than the first picture is not available. In such cases, subsequent to determining that the motion vector information for the bottom collocated block is not available, motion compensation unit 316 may determine whether motion vector information for a right collocated block located in the picture other than the first picture is available (e.g., block 7 816 of FIG. 8A), and based on the motion vector information for the right collocated block being available, motion compensation unit 316 may add the motion vector information for the right collocated block to the first motion vector predictor list.

Motion compensation unit 316 may perform similar operations for adding motion vector information for collocated blocks for constructing the second motion vector predictor list. However, for the second motion vector predictor list, motion compensation unit 316 may add motion vector information based on the availability of center collocated block 5 828, bottom collocated block 6 830, and left collocated block 7 832 of FIG. 8B.

In constructing motion vector predictor lists, motion compensation unit 316 may construct the motion vector predictor lists based on size of the block, in some examples. For instance, motion compensation unit 316 may construct the first motion vector predictor list, having a first maximum size, based on the first block having a size greater than a threshold size. Motion compensation unit 316 may construct a third motion vector predictor list, having a second maximum size that is less than the first maximum size, for a third block in the first picture based on the third block having a size less than the threshold size. As one example, the first maximum size equals six, the second maximum size equals four, and the threshold size equals N×4 or 4×N, where N is less than or equal to eight.

Motion compensation unit 316, with reconstruction unit 310, may be configured to decode the first block and the second block. For example, motion compensation unit 316 receive information indicative of an entry in the first motion vector predictor list and determine a motion vector for the first block based on the entry. Motion compensation unit 316 may determine a prediction block, stored in decoded picture buffer 314, for the first block based on the motion vector. Reconstruction unit 310 may be configured to reconstruct the first block based on the prediction block and received information indicative of residual data representing a difference between the prediction block and the first block. Motion compensation unit 316 and reconstruction unit 310 may be configured to similarly decode the second block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Figure 9:
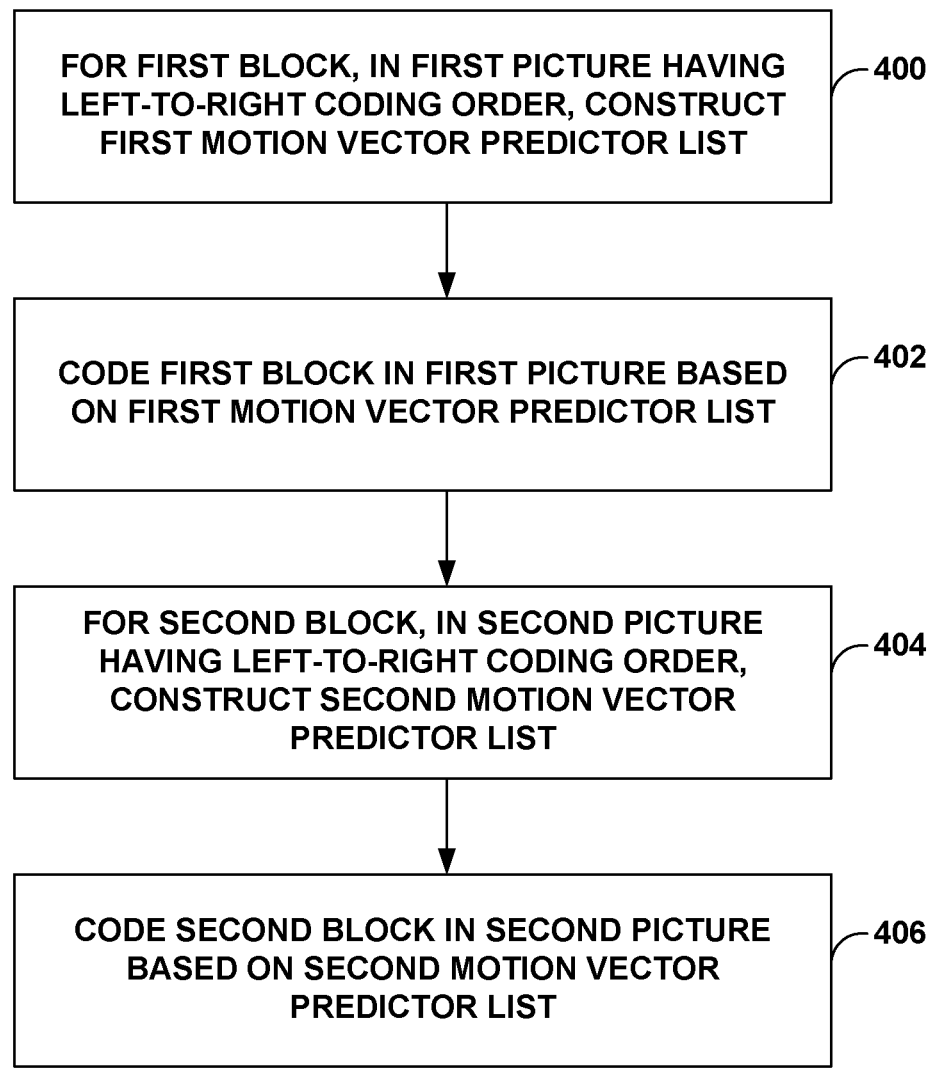
FIG. 9 is a flowchart illustrating an example coding method.

FIG. 9 is a flowchart illustrating an example method of coding data. For ease of description, the example of FIG. 9 is described with respect to processing circuitry. One example of the processing circuitry is video encoder 200. Another example of the processing circuitry is video decoder 300. The processing circuitry may be fixed-function circuitry, programmable circuitry, or a combination of fixed-function and programmable circuitry.

In one or more examples, memory may be configured to store motion vector information such as motion vector information of spatially neighboring blocks and collocated blocks. As one example, the memory may be video data memory 230, decoded picture buffer 218, or memory 106. As another example, the memory may be decoded picture buffer 314 or memory 120.

For a first block, in a first picture having a left-to-right coding order, the processing circuitry may be configured to construct a first motion vector predictor list (400). A first entry in the first motion vector predictor list may be based on motion vector information of a left neighboring block to the first block stored in the memory. One example of the left neighboring block is block 0 802 of FIG. 8A, where block 0 802 of FIG. 8A is located left of current block 800 of FIG. 8A and shares a left boundary of current block 800 of FIG. 8A (e.g., the left neighboring block is a block left of the first block having a bottom boundary that is same as a bottom boundary of the first block). In some examples, the processing circuitry may be configured to construct the first motion vector predictor list having motion vector information in the following order based on motion vector information availability: motion vector information of the left neighboring block (e.g., block 0 802), motion vector information of an above neighboring block (e.g., block 1 804), motion vector information of an above-right neighboring block (e.g., block 2 806), motion vector information of a below-left neighboring block (e.g., block 3 808), and motion vector information of an above-left neighboring block (e.g., block 4 810).

In some examples, to construct the first motion vector predictor list, the processing circuitry may be configured to determine whether motion vector information for a center collocated block (e.g., block 812) located in a picture other than the first picture is available before determining whether motion vector information in any other collocated block located in the picture other than the first picture is available, and based on the motion vector information for the center collocated block being available, add the motion vector information for the center collocated block to the first motion vector predictor list. In some examples, to construct the first motion vector predictor list, the processing circuitry is configured to determine that motion vector information for a center collocated block located in a picture other than the first picture is not available, subsequent to determining that the motion vector information for the center collocated block is not available, determine whether motion vector information for a bottom collocated block (e.g., block 6 814 that is bottom and closest to the right of current block 800 of FIG. 8A) located in the picture other than the first picture is available, and based on the motion vector information for the bottom collocated block being available, add the motion vector information for the bottom collocated block to the first motion vector predictor list. In some examples, a right boundary of the bottom collocated block (e.g., block 6 814) is in same location in the picture other than the first picture as a right boundary of the first block in the first picture.

In some examples, to construct the first motion vector predictor list, the processing circuitry is configured to determine that motion vector information for a center collocated block located in a picture other than the first picture is not available, subsequent to determining that the motion vector information for the center collocated block is not available, determine that motion vector information for a bottom collocated block located in the picture other than the first picture is not available, subsequent to determining that the motion vector information for the bottom collocated block is not available, determine whether motion vector information for a right collocated block (e.g., block 7 816 that is right and closest to the bottom of current block 800 of FIG. 8A) located in the picture other than the first picture is available, and based on the motion vector information for the right collocated block being available, add the motion vector information for the right collocated block to the first motion vector predictor list. In some examples, a bottom boundary of the right collocated block (e.g., block 7 816) is in same location in the picture other than the first picture as a bottom boundary of the first block in the first picture.

The processing circuitry may be configured to code the first block in the first picture based on the first motion vector predictor list (402). As one example, to code the first block in the first picture based on the first motion vector predictor list, the processing circuitry may be configured to decode the first block in the first picture based on the first motion vector predictor list. To decode the first block, the processing circuitry may be configured to receive information indicative of an entry in the first motion vector predictor list, determine a motion vector for the first block based on the entry, determine a prediction block for the first block based on the motion vector, and reconstruct the first block based on the prediction block and received information indicative of residual data representing a difference between the prediction block and the first block. As another example, to code the first block in the first picture based on the first motion vector predictor list, the processing circuitry may be configured to encode the first block in the first picture based on the first motion vector predictor list. To encode the first block, the processing circuitry may be configured to determine a prediction block for the first block, determine a motion vector for the first block that identifies the prediction block, determine an entry in the first motion vector predictor list based on the motion vector, signal information indicative of the entry, and signal information indicative of residual data representing a difference between the first block and the prediction block.

For a second block, in a second picture having a right-to-left coding order, the processing circuitry may be configured to construct a second motion vector predictor list (404). A first entry in the second motion vector predictor list may be based on motion vector information of a right neighboring block to the second block stored in the memory. One example of the right neighboring block is block 0 818 of FIG. 8B, where block 0 818 of FIG. 8B is located right of current block 800 of FIG. 8B and shares a right boundary of current block 800 of FIG. 8B (e.g., the right neighboring block is a block right of the second block having a bottom boundary that is same as a bottom boundary of the second block). In some examples, the processing circuitry may be configured to construct the second motion vector predictor list having motion vector information in the following order based on motion vector information availability: motion vector information of the right neighboring block (e.g., block 0 818), motion vector information of an above neighboring block (e.g., block 1 820), motion vector information of an above-left neighboring block (e.g., block 2 822), motion vector information of a below-right neighboring block (e.g., block 3 824), and motion vector information of an above-right neighboring block (e.g., block 4 826).

In some examples, to construct the second motion vector predictor list, the processing circuitry may be configured to determine whether motion vector information for a center collocated block (e.g., block 5 828) located in a picture other than the second picture is available before determining whether motion vector information in any other collocated block located in the picture other than the second picture is available, and based on the motion vector information for the center collocated block being available, add the motion vector information for the center collocated block to the second motion vector predictor list. In some examples, to construct the second motion vector predictor list, the processing circuitry is configured to determine that motion vector information for a center collocated block located in a picture other than the second picture is not available, subsequent to determining that the motion vector information for the center collocated block is not available, determine whether motion vector information for a bottom collocated block (e.g., block 6 830 that is bottom and closest to the left of current block 800 of FIG. 8B) located in the picture other than the second picture is available, and based on the motion vector information for the bottom collocated block being available, add the motion vector information for the bottom collocated block to the second motion vector predictor list. In some examples, a left boundary of the bottom collocated block (e.g., block 6 830) is in same location in the picture other than the second picture as a left boundary of the second block in the second picture.

In some examples, to construct the second motion vector predictor list, the processing circuitry is configured to determine that motion vector information for a center collocated block located in a picture other than the second picture is not available, subsequent to determining that the motion vector information for the center collocated block is not available, determine that motion vector information for a bottom collocated block located in the picture other than the second picture is not available, subsequent to determining that the motion vector information for the bottom collocated block is not available, determine whether motion vector information for a left collocated block (e.g., block 7 832 that is left and closest to the bottom of current block 800 of FIG. 8B) located in the picture other than the second picture is available, and based on the motion vector information for the left collocated block being available, add the motion vector information for the left collocated block to the second motion vector predictor list. In some examples, a bottom boundary of the left collocated block (e.g., block 7 832) is in same location in the picture other than the second picture as a bottom boundary of the second block in the second picture.

The processing circuitry may be configured to code the second block in the second picture based on the second motion vector predictor list (406). As one example, to code the second block in the second picture based on the second motion vector predictor list, the processing circuitry may be configured to decode the second block in the second picture based on the second motion vector predictor list. To decode the second block, the processing circuitry may be configured to receive information indicative of an entry in the second motion vector predictor list, determine a motion vector for the second block based on the entry, determine a prediction block for the second block based on the motion vector, and reconstruct the second block based on the prediction block and received information indicative of residual data representing a difference between the prediction block and the second block. As another example, to code the second block in the second picture based on the second motion vector predictor list, the processing circuitry may be configured to encode the second block in the second picture based on the second motion vector predictor list. To encode the second block, the processing circuitry may be configured to determine a prediction block for the second block, determine a motion vector for the second block that identifies the prediction block, determine an entry in the second motion vector predictor list based on the motion vector, signal information indicative of the entry, and signal information indicative of residual data representing a difference between the second block and the prediction block.

The following are some example techniques that may be performed together and/or in combination with any of the techniques described in this disclosure. The following examples are merely some examples and should not be considered limiting or necessary in all examples.

Example 1

A method of coding video data, the method comprising constructing a motion vector predictor list comprising five spatial candidates and up to three collocated temporal candidates and coding a block of video data using the motion vector predictor list.

Example 2

The method of example 1, wherein constructing the motion vector predictor list comprises checking the availability of spatial candidates before checking the availability of collocated temporal candidates.

Example 3

The method of example 1, wherein the five spatial candidates and the three collocated temporal candidates are located in a pattern shown in FIG. 8A.

Example 4

The method of example 1, wherein the five spatial candidates and the three collocated temporal candidates are located in a pattern shown in FIG. 8B.

Example 5

The method of example 1, wherein the five spatial candidates and the three collocated temporal candidates are located in a pattern shown in FIG. 8C.

Example 6

The method of example 1, further comprising determining the five spatial candidates and the three collocated temporal candidates based on one or more of a coding mode for the block, a type of partitioning of the block, or a coding direction of the block.

Example 7

The method of example 1, wherein constructing the motion vector predictor list comprises checking the availability of spatial candidates in parallel with checking the availability of collocated temporal candidates.

Example 8

The method of example 7, further comprising determining the validity of a respective position of the spatial candidates and the collocated temporal candidates and adding motion information to the motion vector predictor list from candidates that are determined to be valid.

Example 9

The method of example 1, wherein constructing the motion vector predictor list comprises determining a maximum effective size of the motion vector predictor list based on a size of the block of video data and constructing the motion vector predictor list based on the maximum effective size.

Example 10

The method of any combination of techniques of examples 1-9.

Example 11

The method of any of examples 1-10, wherein coding comprises decoding.

Example 12

The method of any of examples 1-10, wherein coding comprises encoding.

Example 13

A device for coding video data, the device comprising one or more means for performing the method of any of examples 1-10.

Example 14

The device of example 13, wherein the one or more means comprise one or more processors implemented in circuitry.

Example 15

The device of any of examples 13 and 14, further comprising a memory to store the video data.

Example 16

The device of any combination of examples 13-15, further comprising a display configured to display decoded video data.

Example 17

The device of any combination of examples 13-16, wherein the device comprises one or more of a camera, a computer, a mobile device, a broadcast receiver device, or a set-top box.

Example 18

The device of any combination of examples 13-17, wherein the device comprises a video decoder.

Example 19

The device of any combination of examples 13-18, wherein the device comprises a video encoder.

Example 20

A computer-readable storage medium having stored thereon instructions that, when executed, cause one or more processors to perform the method of any of examples 1-10.

Example 21

Any combination of techniques described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
for a first block, in a first picture having a left-to-right coding order, constructing a first motion vector predictor list, wherein a first entry in the first motion vector predictor list is based on motion vector information of a left neighboring block to the first block;
coding the first block in the first picture based on the first motion vector predictor list;
for a second block, in a second picture having a right-to-left coding order, constructing a second motion vector predictor list, wherein a first entry in the second motion vector predictor list is based on motion vector information of a right neighboring block to the second block; and
coding each block in the second picture in the right-to-left coding order, wherein coding each block in the second picture comprises coding the second block in the second picture based on the second motion vector predictor list.

2. The method of claim 1, wherein constructing the first motion vector predictor list comprises constructing the first motion vector predictor list having motion vector information in the following order based on motion vector information availability:
motion vector information of the left neighboring block;
motion vector information of an above neighboring block;
motion vector information of an above-right neighboring block;
motion vector information of a below-left neighboring block; and
motion vector information of an above-left neighboring block.

3. The method of claim 1, wherein constructing the second motion vector predictor list comprises constructing the second motion vector predictor list having motion vector information in the following order based on motion vector information availability:
motion vector information of the right neighboring block;
motion vector information of an above neighboring block;
motion vector information of an above-left neighboring block;
motion vector information of a below-right neighboring block; and
motion vector information of an above-right neighboring block.

4. The method of claim 1, wherein the left neighboring block to the first block comprises a block left of the first block having a bottom boundary that is same as a bottom boundary of the first block, and wherein the right neighboring block comprises a block right of the second block having a bottom boundary that is same as a bottom boundary of the second block.

5. The method of claim 1, wherein constructing the first motion vector predictor list comprises checking motion vector information for a plurality of spatially neighboring blocks used to construct the first motion vector predictor list in parallel.

6. The method of claim 1, wherein constructing the first motion vector predictor list comprises:
determining whether motion vector information for a center collocated block located in a picture other than the first picture is available before determining whether motion vector information in any other collocated block located in the picture other than the first picture is available; and based on the motion vector information for the center collocated block being available, adding the motion vector information for the center collocated block to the first motion vector predictor list.

7. The method of claim 1, wherein constructing the first motion vector predictor list comprises:
determining that motion vector information for a center collocated block located in a picture other than the first picture is not available;
subsequent to determining that the motion vector information for the center collocated block is not available, determining whether motion vector information for a bottom collocated block located in the picture other than the first picture is available; and
based on the motion vector information for the bottom collocated block being available, adding the motion vector information for the bottom collocated block to the first motion vector predictor list.

8. The method of claim 7, wherein a right boundary of the bottom collocated block is in same location in the picture other the first picture as a right boundary of the first block in the first picture.

9. The method of claim 1, wherein constructing the second motion vector predictor list comprises:
determining that motion vector information for a center collocated block located in a picture other than the second picture is not available;
subsequent to determining that the motion vector information for the center collocated block is not available, determining whether motion vector information for a bottom collocated block located in the picture other than the second picture is available; and
based on the motion vector information for the bottom collocated block being available, adding the motion vector information for the bottom collocated block to the second motion vector predictor list.

10. The method of claim 9, wherein a left boundary of the bottom collocated block is in same location in the picture other the second picture as a left boundary of the second block in the second picture.

11. The method of claim 1, wherein constructing the first motion vector predictor list comprises:
determining that motion vector information for a center collocated block located in a picture other than the first picture is not available;
subsequent to determining that the motion vector information for the center collocated block is not available, determining that motion vector information for a bottom collocated block located in the picture other than the first picture is not available;
subsequent to determining that the motion vector information for the bottom collocated block is not available, determining whether motion vector information for a right collocated block located in the picture other than the first picture is available; and
based on the motion vector information for the right collocated block being available, adding the motion vector information for the right collocated block to the first motion vector predictor list.

12. The method of claim 11, wherein a bottom boundary of the right collocated block is in same location in the picture other the first picture as a bottom boundary of the first block in the first picture.

13. The method of claim 1, wherein constructing the second motion vector predictor list comprises:
determining that motion vector information for a center collocated block located in a picture other than the second picture is not available;
subsequent to determining that the motion vector information for the center collocated block is not available, determining that motion vector information for a bottom collocated block located in the picture other than the second picture is not available;
subsequent to determining that the motion vector information for the bottom collocated block is not available, determining whether motion vector information for a left collocated block located in the picture other than the second picture is available; and
based on the motion vector information for the left collocated block being available, adding the motion vector information for the left collocated block to the second motion vector predictor list.

14. The method of claim 13, wherein a bottom boundary of the left collocated block is in same location in the picture other the second picture as a bottom boundary of the second block in the second picture.

15. The method of claim 1, wherein constructing the first motion vector predictor list comprises constructing the first motion vector predictor list, having a first maximum size, based on the first block having a size greater than a threshold size, the method further comprising:
constructing a third motion vector predictor list, having a second maximum size that is less than the first maximum size, for a third block in the first picture based on the third block having a size less than the threshold size.

16. The method of claim 15, wherein the first maximum size equals six, wherein the second maximum size equals four, and wherein the threshold size equals N×4 or 4×N, where N is less than or equal to eight.

17. The method of claim 1, wherein coding the first block in the first picture based on the first motion vector predictor list comprises decoding the first block in the first picture based on the first motion vector predictor list, wherein decoding the first block comprises:
receiving information indicative of an entry in the first motion vector predictor list;
determining a motion vector for the first block based on the entry;
determining a prediction block for the first block based on the motion vector; and
reconstructing the first block based on the prediction block and received information indicative of residual data representing a difference between the prediction block and the first block.

18. The method of claim 1,
wherein coding the first block in the first picture based on the first motion vector predictor list comprises encoding the first block in the first picture based on the first motion vector predictor list, wherein encoding the first block comprises:
determining a prediction block for the first block;
determining a motion vector for the first block that identifies the prediction block;
determining an entry in the first motion vector predictor list based on the motion vector;
signaling information indicative of the entry; and
signaling information indicative of residual data representing a difference between the first block and the prediction block.

19. A device for coding video data, the device comprising:
memory configured to store motion vector information; and
processing circuitry coupled to the memory, wherein the processing circuitry is configured to:
for a first block, in a first picture having a left-to-right coding order, construct a first motion vector predictor list, wherein a first entry in the first motion vector predictor list is based on motion vector information of a left neighboring block to the first block stored in the memory;
code the first block in the first picture based on the first motion vector predictor list;
for a second block, in a second picture having a right-to-left coding order, construct a second motion vector predictor list, wherein a first entry in the second motion vector predictor list is based on motion vector information of a right neighboring block to the second block stored in the memory; and
code each block in the second picture in the right-to-left coding order, wherein to code to each block in the second picture the processing circuitry is configured to code the second block in the second picture based on the second motion vector predictor list.

20. The device of claim 19, wherein to construct the first motion vector predictor list, the processing circuitry is configured to construct the first motion vector predictor list having motion vector information in the following order based on motion vector information availability:
motion vector information of the left neighboring block;
motion vector information of an above neighboring block;
motion vector information of an above-right neighboring block;
motion vector information of a below-left neighboring block; and
motion vector information of an above-left neighboring block.

21. The device of claim 19, wherein to construct the second motion vector predictor list, the processing circuitry is configured to construct the second motion vector predictor list having motion vector information in the following order based on motion vector information availability:
motion vector information of the right neighboring block;
motion vector information of an above neighboring block;
motion vector information of an above-left neighboring block;
motion vector information of a below-right neighboring block; and
motion vector information of an above-right neighboring block.

22. The device of claim 19, wherein the left neighboring block to the first block comprises a block left of the first block having a bottom boundary that is same as a bottom boundary of the first block, and wherein the right neighboring block comprises a block right of the second block having a bottom boundary that is same as a bottom boundary of the second block.

23. The device of claim 19, wherein to construct the first motion vector predictor list, the processing circuitry is configured to check motion vector information for a plurality of spatially neighboring blocks used to construct the first motion vector predictor list in parallel.

24. The device of claim 19, wherein to construct the first motion vector predictor list, the processing circuitry is configured to:
determine whether motion vector information for a center collocated block located in a picture other than the first picture is available before determining whether motion vector information in any other collocated block located in the picture other than the first picture is available; and
based on the motion vector information for the center collocated block being available, add the motion vector information for the center collocated block to the first motion vector predictor list.

25. The device of claim 19, wherein to construct the first motion vector predictor list, the processing circuitry is configured to:
determine that motion vector information for a center collocated block located in a picture other than the first picture is not available;
subsequent to determining that the motion vector information for the center collocated block is not available, determine whether motion vector information for a bottom collocated block located in the picture other than the first picture is available; and
based on the motion vector information for the bottom collocated block being available, add the motion vector information for the bottom collocated block to the first motion vector predictor list,
wherein a right boundary of the bottom collocated block is in same location in the picture other the first picture as a right boundary of the first block in the first picture.

26. The device of claim 19, wherein to construct the second motion vector predictor list, the processing circuitry is configured to:
determine that motion vector information for a center collocated block located in a picture other than the second picture is not available;
subsequent to determining that the motion vector information for the center collocated block is not available, determine that motion vector information for a bottom collocated block located in the picture other than the second picture is not available;
subsequent to determining that the motion vector information for the bottom collocated block is not available, determine whether motion vector information for a left collocated block located in the picture other than the second picture is available; and
based on the motion vector information for the left collocated block being available, add the motion vector information for the left collocated block to the second motion vector predictor list, wherein a bottom boundary of the left collocated block is in same location in the picture other the second picture as a bottom boundary of the second block in the second picture.

27. The device of claim 19, wherein to construct the first motion vector predictor list, the processing circuitry is configured to construct the first motion vector predictor list, having a first maximum size, based on the first block having a size greater than a threshold size, and wherein the processing circuitry is configured to:
construct a third motion vector predictor list, having a second maximum size that is less than the first maximum size, for a third block in the first picture based on the third block having a size less than the threshold size.

28. The device of claim 27, wherein the first maximum size equals six, wherein the second maximum size equals four, and wherein the threshold size equals N×4 or 4×N, where N is less than or equal to eight.

29. The device of claim 19, wherein the device comprises a wireless communication device.

30. A non-transitory computer-readable storage medium storing instructions thereon that when executed cause one or more processors to:
- for a first block, in a first picture having a left-to-right coding order, construct a first motion vector predictor list, wherein a first entry in the first motion vector predictor list is based on motion vector information of a left neighboring block to the first block;
- code the first block in the first picture based on the first motion vector predictor list;
- for a second block, in a second picture having a right-to-left coding order, construct a second motion vector predictor list, wherein a first entry in the second motion vector predictor list is based on motion vector information of a right neighboring block to the second block; and
- code each block in the second picture in the right-to-left coding order, wherein to code each block in the second picture the instructions further cause the one or more processors to code the second block in the second picture based on the second motion vector predictor list.

* * * * *